United States Patent [19]

Le et al.

[11] Patent Number: 5,304,916
[45] Date of Patent: Apr. 19, 1994

[54] BATTERY CHARGER

[75] Inventors: Hung Q. Le, Houston; Dean P. Perkins, Tomball, both of Tex.

[73] Assignee: Compaq Computer Corporation, Houston, Tex.

[21] Appl. No.: 508,236

[22] Filed: Apr. 11, 1990

[51] Int. Cl.$^5$ .............................................. H02J 7/00
[52] U.S. Cl. ........................................ 320/23; 320/39; 320/40; 320/43
[58] Field of Search .................. 320/23, 39, 40, 43

[56] References Cited

U.S. PATENT DOCUMENTS

| | | | |
|---|---|---|---|
| 3,652,915 | 3/1972 | Eberts | 320/31 |
| 4,006,397 | 2/1977 | Catotti et al. | 320/31 |
| 4,061,956 | 12/1977 | Brown et al. | 320/22 |
| 4,118,661 | 10/1978 | Sierkierski et al. | 320/40 |
| 4,209,736 | 6/1980 | Reidenbach | 320/22 |
| 4,225,815 | 9/1980 | Lind et al. | 320/39 |
| 4,371,826 | 2/1983 | Shelly | 320/21 |
| 4,392,101 | 7/1983 | Saar et al. | 320/20 |
| 4,418,310 | 11/1983 | Bollinger | 320/39 |
| 4,433,277 | 2/1984 | Carollo et al. | 320/24 |
| 4,455,523 | 6/1984 | Koenck | 320/43 |
| 4,553,081 | 11/1985 | Koenck | 320/43 |
| 4,609,860 | 9/1986 | Fasen | 320/39 |
| 4,629,965 | 12/1986 | Fallon et al. | 320/39 |
| 4,639,655 | 1/1987 | Westhaver et al. | 320/20 |
| 4,670,703 | 6/1987 | Williams | 320/22 |
| 4,677,363 | 6/1987 | Kopmann | 320/20 |
| 4,709,202 | 11/1987 | Koenck et al. | 320/43 |
| 4,746,854 | 5/1988 | Baker et al. | 320/40 |
| 4,767,977 | 7/1988 | Fasen et al. | 320/20 |
| 4,820,965 | 4/1989 | Siemer | 320/31 |
| 4,843,299 | 6/1989 | Hutchings | 320/31 |
| 4,918,368 | 4/1990 | Baker et al. | 320/40 |
| 4,947,123 | 8/1990 | Minezawa | 320/48 |
| 4,961,043 | 10/1990 | Koenck | 320/21 |
| 5,049,804 | 1/1991 | Hutchings | 320/20 |

FOREIGN PATENT DOCUMENTS

| | | | |
|---|---|---|---|
| 3901096 | 8/1989 | Fed. Rep. of Germany | H07J 7/04 |
| 0316643 | 12/1988 | Japan | H02J 7/04 |
| 0616688 | 7/1978 | U.S.S.R. | H02H 7/34 |
| 1190429A | 11/1985 | U.S.S.R. | H01M 10/44 |
| 2086674 | 5/1982 | United Kingdom | 320/40 |

OTHER PUBLICATIONS

Compaq Computer Corporation, "Dual Battery Charger Schematic," May 19, 1989, pp. 1–4.

Primary Examiner—Steven L. Stephan
Assistant Examiner—Thomas M. Dougherty
Attorney, Agent, or Firm—Pravel, Hewitt, Kimball & Krieger

[57] ABSTRACT

A battery charger is provided for use in electronic devices such as a portable computer. When the electronic device is being powered by an external source of power, such as an AC adapter, the battery charger charges the batteries in the electronic device. First, the battery charger checks the batteries to determine if they are capable of holding a charge. Next, the batteries are fully charged. After the batteries have been fully charged, the battery charger maintains the charge on the batteries by supplying low current to the batteries. Moreover, since batteries that are not allowed to discharge tend to lose charge more quickly than batteries that are discharged and recharged often, the battery charger is capable of discharging and then recharging the batteries while the electronic device is being externally powered.

10 Claims, 12 Drawing Sheets

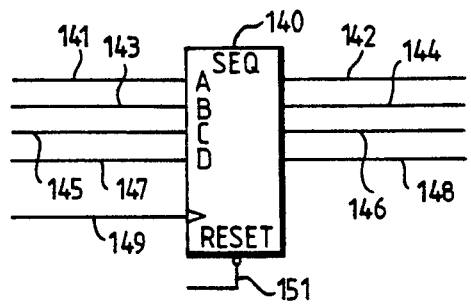
FIG.8
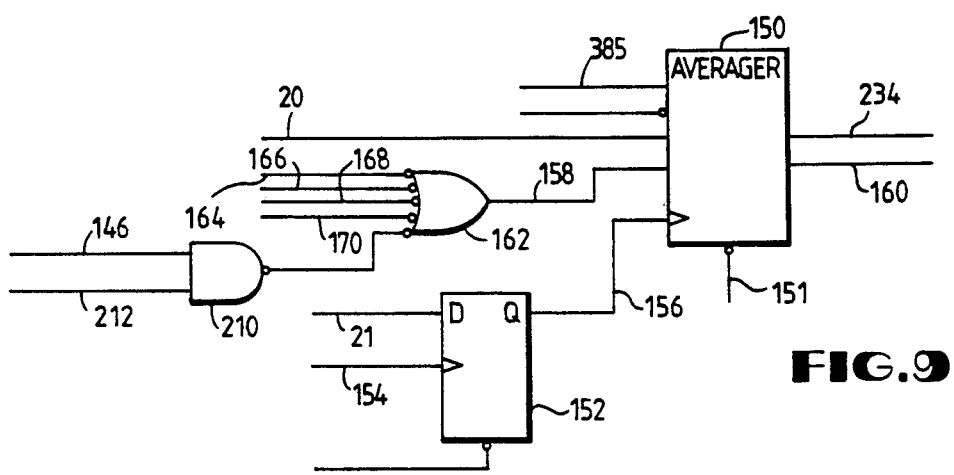
FIG.9
FIG.10
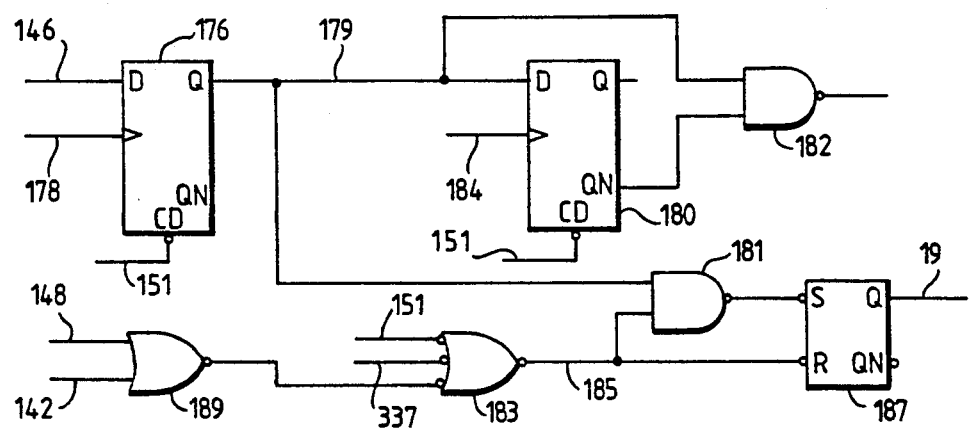
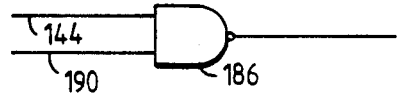
FIG.11
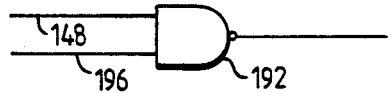
FIG.12

BATTERY CHARGER

BACKGROUND OF THE INVENTION

1. Field of the Invention

The present invention relates generally to battery chargers, and more particularly to an application specific integrated circuit (ASIC) that is configured to charge nickel cadmium (NiCad) battery cells.

2. Description of the Related Art

Many electronic devices rely on batteries for power. Since batteries are relatively expensive and need frequent replacement, rechargeable batteries, such as NiCad batteries, are used instead. When rechargeable batteries are used in devices that rely solely on batteries for power, such as small transistor radios, the rechargeable batteries must be periodically removed from the device and charged in a separate battery charger. However, many electronic devices include AC adapters and an internal battery charger. When the device is being externally powered by the AC adapter, the battery charger replenishes the rechargeable battery cells.

In many devices, the battery chargers measure the temperature of the rechargeable batteries and relate the temperature of the battery to the charge on the battery. Unfortunately, these types of charging devices are riddled with problems. First, temperature sensors must be implanted in each battery. This increases the manufacturing expense of each battery. Second, changes in the ambient temperature upset the correlation between the temperature of the battery and the charge on the battery. The battery charger could overcharge the battery in low ambient temperature conditions, or undercharge the battery in high ambient temperature conditions.

For instance, one type of temperature sensing battery charger delivers high charging current to batteries while the temperature of the batteries is below 40° C. Once the temperature of the batteries exceeds 40° C., the batteries are deemed fully charged. Therefore, the high current is replaced by a lower current to maintain the charge on the batteries while the device is in use. However, if the batteries are in an environment having a low ambient temperature, the high current could overcharge the batteries, and, thus, damage the batteries.

Even if battery damage does not occur, overcharged batteries exhibit a phenomenon known as "voltage depression". Voltage depression occurs when the batteries exceed 100% charge and the voltage across the batteries begins to fall. Since decreasing battery voltage is not a desirable function of a battery charger, battery chargers of this type exhibit clear disadvantages.

Moreover, batteries that remain fully charged, yet are seldom discharged exhibit "battery memory." Battery memory substantially decreases the operating life of a battery, because the battery discharges quickly. To avoid this problem, electronic devices containing rechargeable batteries must be periodically used without external power so that the batteries may discharge.

SUMMARY OF THE INVENTION

In accordance with one aspect of the present invention, there is provided a battery charger that includes: (1) means for charging a battery at a first preselected rate; (2) means for delivering a signal in response to a predetermined charge on the battery; (3) means for charging the battery at a second preselected rate in response to receiving the signal, where the second preselected rate is lower than the first preselected rate. Preferably, the battery is charged at a relatively high rate until the battery is fully charged. Once fully charged, the battery continues to be charged at a relatively low rate to maintain the full charge.

In accordance with another aspect of the present invention, there is provided a battery charger that includes: (1) means for monitoring charge on a battery; (2) means for delivering a fast charge signal in response to a first predetermined charge on the battery; (3) means for charging the battery at a first preselected rate in response to receiving the fast charge signal; (4) means for delivering a trickle charge signal in response to the battery charging to a second predetermined charge, where the second predetermined charge is greater than the first predetermined charge; (5) means for charging the battery at a second preselected rate in response to receiving the trickle charge signal, where the second preselected rate is lower than the first preselected rate; (6) means for partially discharging the battery in response to receiving an extended charge signal; and (7) means for delivering the fast charge signal in response to the battery partially discharging to a third predetermined charge, where the third predetermined charge is less than the first predetermined charge. Preferably, the battery charger fully charges the battery if the battery is capable of holding a sufficient charge. Once the battery is fully charged, the battery charger maintains the charge on the battery. However, to avoid the "memory loss" phenomenon, the battery charger can partially discharge the battery, and then recharge it.

BRIEF DESCRIPTION OF THE DRAWINGS

Advantages of the invention will become apparent upon reading the following detailed description and upon reference to the drawings in which:

FIG. 8 is a logic diagram of a state machine (sequencer) including various states (charging cycles) of a battery charger embodying the present invention;

FIG. 9 is a logic circuit that controls the reception of measured battery voltage signals and averages the measured signals;

FIG. 10 is a logic circuit that provides an initial delay to allow the power supply to stabilize and that provides a signal to charge the cells with high current;

FIG. 11 is a logic circuit that indicates a fault in the fast charge cycle;

FIG. 12 is a logic circuit that indicates a fault in the extended charge cycle;

Figure 1:
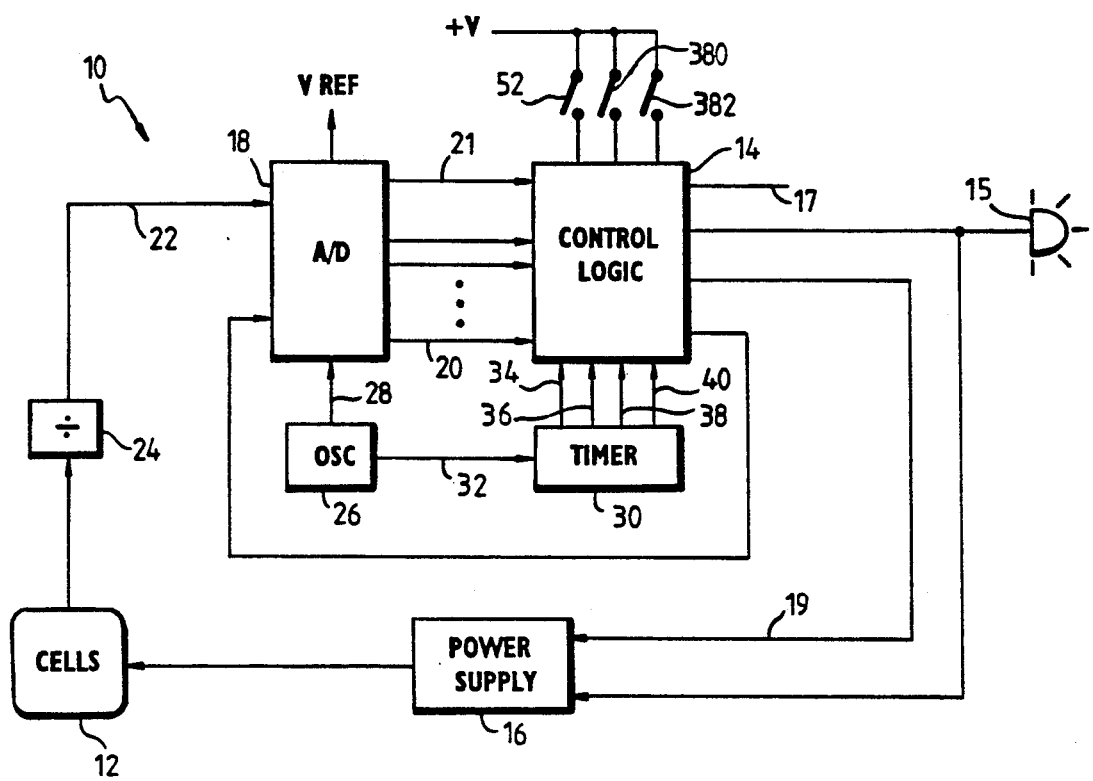
FIG. 1 is a block diagram of a battery charging device in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF THE PREFERRED EMBODIMENTS

Turning now to the drawings and referring initially to FIG. 1, a battery charger is generally designated by the reference numeral 10. The battery charger 10 recharges the rechargeable battery cells 12, which are preferably nickel cadmium (NiCad) battery cells. Preferably, the battery charger 10 is used in a portable electronic device (not shown), such as a portable, lap-top computer. In addition, the electronic device should include an AC adapter (also not shown), or other means of attaching the device to external power, that provides power to recharge the cells 12.

The battery charger 10 includes control logic 14 that executes various functions of the battery charger 10, as will be described hereinafter. Preferably, the control logic 14 is in the form of an application specific integrated circuit (ASIC). An ASIC is a gate array that can be programmed to perform selected logical functions. While an ASIC is a convenient means to embody the functions of the battery charger 10, discrete logic or software-controlled logic may also be used.

The control logic 14 controls a power supply 16 that is electrically connected to the cells 12. Under the control of the control logic 14, the power supply 16 can supply (1) high current (approximately 1 amp) to the cells 12 to recharge the cells 12, (2) low current (approximately 125 milliamps) to the cells 12 to maintain the charge on the cells 2, or (3) a load to partially discharge the cells.

The control logic 14 measures the voltage across the cells 12 using an analog-to-digital (A/D) converter 18. The analog input to the A/D converter 18 is received on line 22, and the A/D converter 18 converts the analog signal into a digital signal. The A/D converter 18 outputs the digital signal on a data bus 20. For the purposes of this discussion, the data bus 20 is a 10-bit data bus. The A/D converter 18 is connected to the control logic 14 via the 10-bit data bus 20.

Preferably, the analog input on line 22 represents the voltage across a single cell 12. Therefore, if there are multiple cells 12, a divider circuit 24 is inserted into the line 22 between the cells 12 and the A/D converter 18. For instance, if there are four serially-connected cells 12, the divider circuit 24 divides the voltage from the cells 12 by four so that the signal on line 22 represents the voltage across a single cell 12.

By way of example, if the maximum voltage across each of the cells 12 is about 1.7 volts, then the reference voltage Vref of the A/D converter 18 is selected to be about 2.0 volts. Since the A/D converter 18 converts an analog signal into a 10-bit digital signal, the resolution of the A/D converter 18 is approximately 1.95 millivolts. Therefore, every 1.95 millivolt change in the analog signal on line 22 will produce a corresponding change in the digital signal on data bus 20, i.e., the digital signal will increase or decrease by a binary "1".

An oscillator 26 provides a clock signal to the A/D converter 18 (via line 28) and to a timer 30 (via line 32). The timer 30 generates several delay signals which are delivered to the control logic 14 via lines 34, 36, 38 and 40. The purposes of these various delays will become apparent as the functions embodied in the control logic 14 are described.

Figure 2:
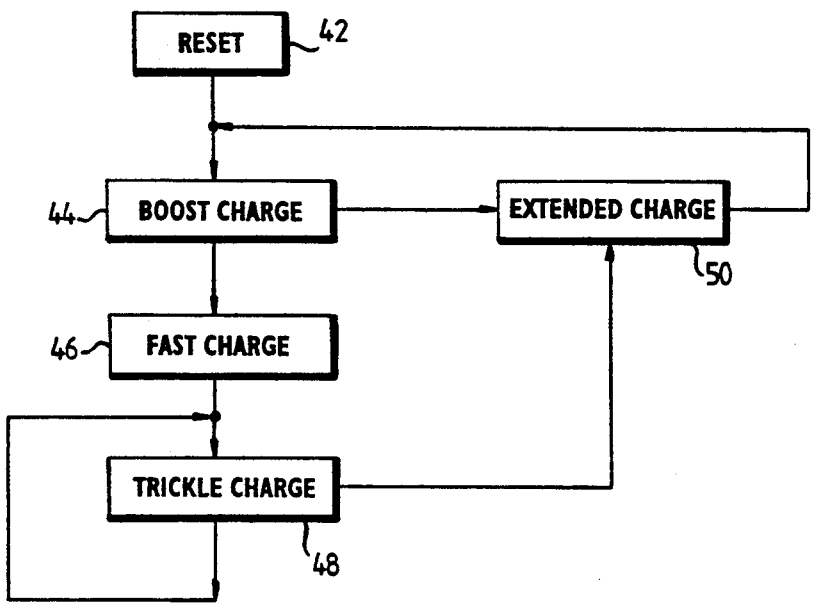
FIG. 2 is a state diagram that represents transitions between various charging cycles in accordance with the present invention.

Referring now to FIG. 2, when the electronic device which contains the battery charger 10 is turned on, a "power-on reset" signal is delivered to the battery charger 10, as illustrated in block 42. Reception of the power-on reset signal causes the battery charger 10 to initiate a "boost charge" cycle in block 44. In the boost charge cycle, the battery charger 10 checks the charge on the cells 12 to determine if the cells hold a predetermined charge, e.g., 70–80% of full charge. If the charge on the cells 12 is less than the predetermined charge, the control logic 14 signals the power supply 16 to provide high current to the cells 12 for a predetermined amount of time. If at the end of the predetermined amount of time, the cells still do not hold the predetermined charge, battery charging is discontinued and a fault is indicated. However, if the cells 12 hold the predetermined charge, either upon first inspection or after the predetermined amount of time, the control logic 14 switches the battery charger 10 into a "fast charge" cycle in block 46.

In the fast charge cycle, the power supply 16 delivers high current to the cells 12 until the cells 12 are fully charged. If the cells 12 do not fully charge within a predetermined amount of time, battery charging is discontinued and a fault is indicated. However, if the cells 12 reach full charge while the AC adapter is still delivering power to the electronic device, the control logic 14 leaves the fast charge cycle and initiates a "trickle charge" cycle in block 48.

In the trickle charge cycle, the control logic 14 causes the power supply 16 to deliver low current to the cells 12. The low current maintains full charge on the cells 12. The battery charger 10 remains in the trickle charge cycle until the external source of power, i.e., the AC adapter, is disconnected from the electronic device.

The battery charger 10 further includes an "extended charge" cycle that is initiated in block 50. The extended charge cycle discharges the cells 12 to prevent a phenomenon known as "voltage depression." Voltage depression occurs when rechargeable cells are used over a period of time without being significantly discharged. Such a condition may occur if the electronic device is always operated with its AC adapter. Preferably, the extended charge cycle is initiated via an external reset signal. For the purposes of illustration, the opening of switch 52 in FIG. 1 provides such a reset signal. In addition, the extended charge cycle cannot be initiated when the battery charger 10 is in the fast charge cycle, since discharging a fully charged battery cell is time consuming.

The various cycles of the battery charger 10 are described in greater detail with reference to the flowcharts illustrated in FIGS. 3-7. It should be understood that the flowcharts depict a preferred method of operation of the battery charger 10, and are not intended to limit the battery charger 10 to this particular method of operation.

Figure 3:
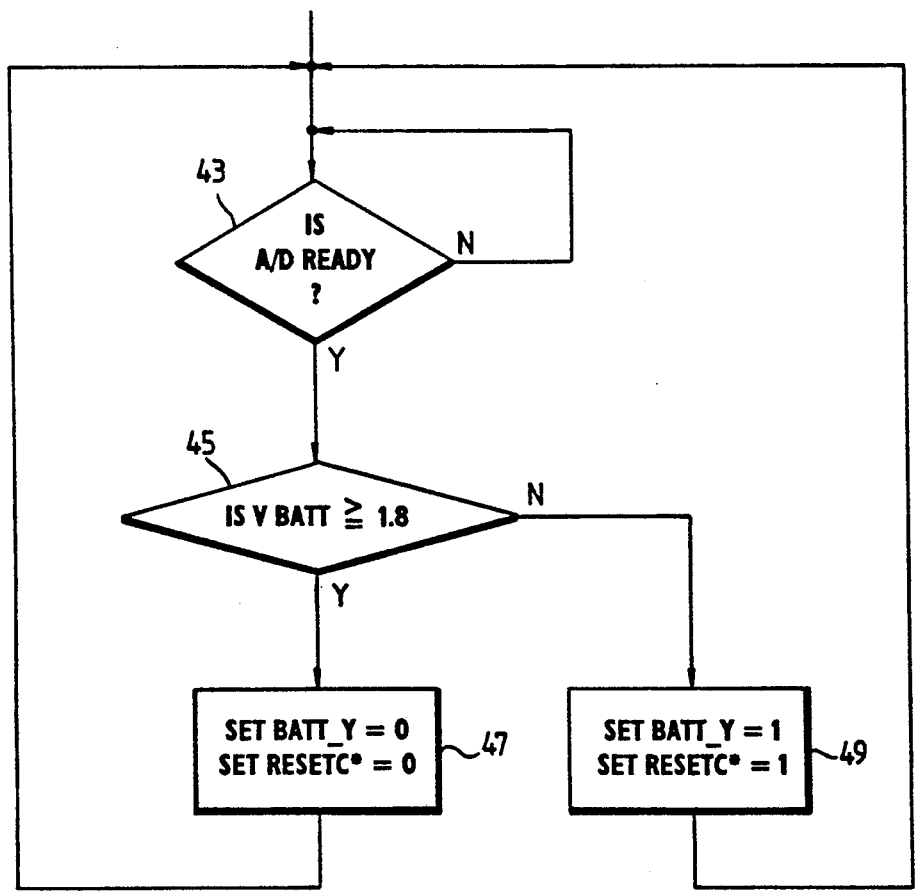
FIG. 3 is a flow chart that represents a battery check cycle of a battery charger that embodies the present invention.

Referring first to FIG. 3, the battery charger 10 determines whether the cells 12 are present immediately after the electronic device is powered on. The flow chart illustrated in FIG. 3 represents a scheme for accomplishing this function. The A/D converter 18 delivers a signal to the control logic 14 via a line 21. If the digital signal on the line 21 is a logical "1", the A/D converter 18 is ready and the digital signal on the data bus 20 is present. Therefore, the control logic 14 will read the measured voltage signal from the data bus 20. Conversely, if the signal on line 21 is a logical "0", the A/D converter 18 is not ready, so the control logic 14 will not attempt to read the signal on the data bus 20.

To determine if the cells 12 are present, the signal from line 21 is received in block 43. If the A/D converter 18 is ready, e.g., the signal on line 21 is a logical "1" then the voltage across the cells 12 is compared to a first preselected voltage in block 45. The first preselected voltage represents the maximum possible voltage across the cells 12. If the measured voltage is less than the first preselected voltage, then the cells 12 are present. When the cells 12 are present, a "flag" is set in block 49 so that the control logic 14 knows that the cells 12 are present and will continue to execute the various charge cycles. However, if the measured voltage is greater than the maximum voltage, then the cells 12 are not present. If the cells 12 are not present, a "flag" is set in block 47. This flag alerts the control logic 14 that the cells 12 are absent, and, accordingly, the battery charger 10 does not initiate the various charging cycles.

Figure 4:
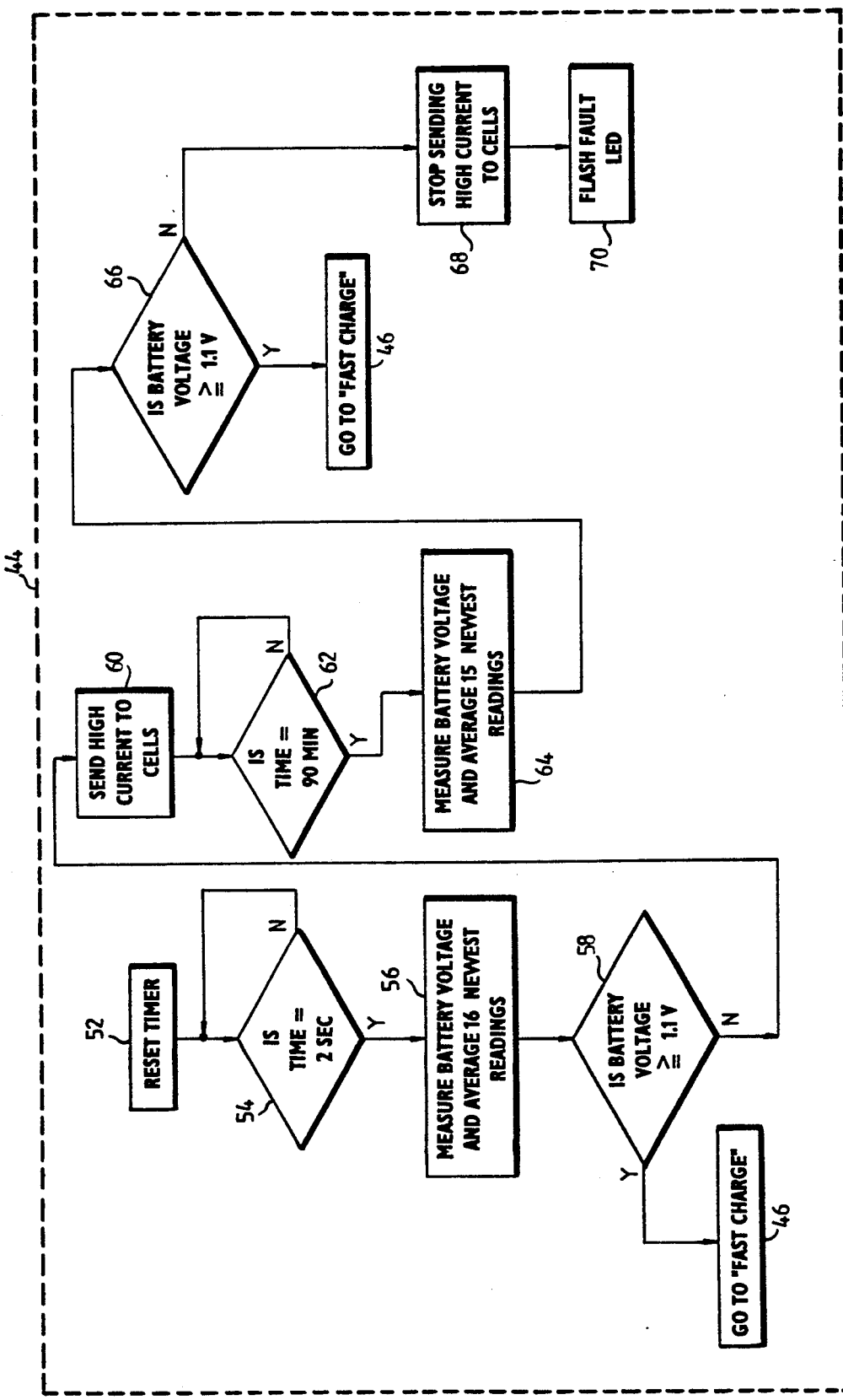
FIG. 4 is a flow chart that represents the boost charge cycle of a battery charger that embodies the present invention.

Referring next to FIG. 4, when the boost charge cycle is initiated (block 44), the timer 30 is reset in block 53. Since the battery charger 10 enters the boost charge cycle when the electronic device is turned on, a short delay, e.g., 2 seconds, is provided in block 54 so that the output of the power supply 16 has time to stabilize.

Once the power supply 16 is stabilized, the voltage across the cells 12 is measured in block 56, as described in reference to FIG. 1. Preferably, the control logic 14 measures the voltage across the cells 12 several times and averages these measured voltages. The averaging minimizes fluctuations and noise on the data bus 20 that are mainly due to noise o the line 22.

Once the voltage across the cells 12 is measured, the measured voltage is compared to a first preselected voltage in block 58. This comparison determined whether the cells 12 are capable of being recharged. Usually if the cells 12 carry about 70% of their nominal charge, then hey are capable of being recharged. For instance, if the nominal charge on the cells 12 results in a voltage of about 1.5 volts/cell, the first preselected voltage would be approximately 1.1 volts/cell. Consequently, if the measured voltage is greater than the first preselected voltage, the boost charge cycle transfers control to the fast charge cycle (block 46) where the cells 12 are recharged.

However, if the measured voltage is less than the first preselected voltage, high current is delivered to the cells 12 (block 60) for a first predetermined amount of time. Block 62 controls the amount of time that the high current is delivered to the cells 12. For a small lap-top computer that contains 4 to 6 battery cells, approximately 90 minutes of charging with high current should bring the cells to at least 70% of nominal voltage.

After the cells 12 have received high charging current for the first predetermined amount of time, the voltage across the cells 12 is measured again in block 64. As before, preferably, the voltage is measured several times and averaged. In block 66, the measured voltage is compared to the first preselected voltage. If the measured voltage is greater than the first preselected voltage, then the cells 12 are in condition to be recharged. Therefore, control transfers to the fast charge cycle (block 46).

However, if the measured voltage is still not greater than the first preselected voltage, the cells 12 are not in good condition and require replacement. Therefore, the battery charger 10 ceases to send high current to the cells 12 in block 68. In block 70, a signal is sent to a light emitting diode (LED) 15 and causes the LED 15 to flash. The flashing LED 15 indicates to the user of the electronic device that the cells 12 cannot be properly recharged and should be replaced.

Normally, the cells 12 will be in good condition and will be rechargeable. Therefore, the boost charge cycle will transfer control to the fast charge cycle (block 46). The fast charge cycle is illustrated by the flow chart shown in FIG. 5. When the fast charge cycle is initiated, the timer 30 is reset in block 72. High current is delivered to the cells 12 via the power supply 16 in block 74. For instance, approximately 1 amp is sufficient to quickly charge 4 to 6 rechargeable cells in a small laptop computer. In addition, the extended charge cycle, briefly described above, is disabled in block 76 while the battery charger 10 executes the fast charge cycle.

Figure 6:
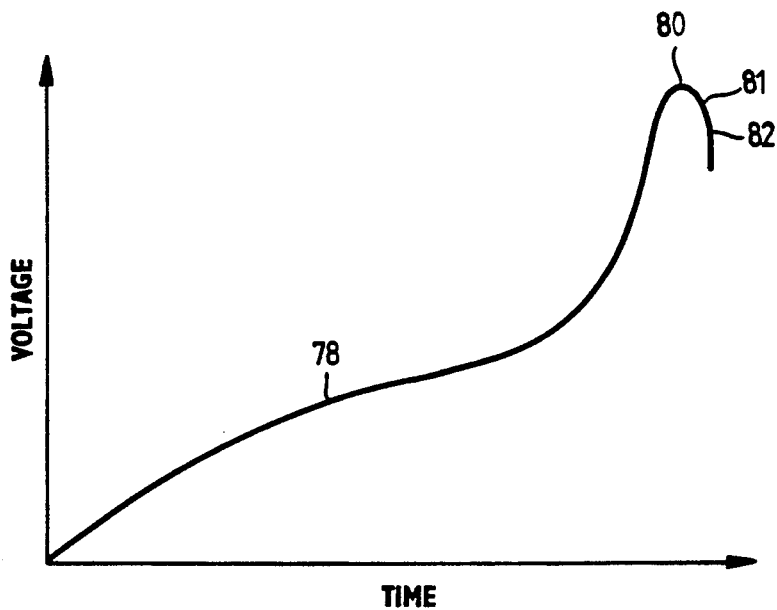
FIG. 6 illustrates the voltage with respect to time of a charging battery.

The object of the fast charge cycle is to optimally charge the cells 12. Referring briefly to FIG. 6, a curve 78 is illustrated. The curve 78 represents the change in voltage across a cell 12 with respect to the charging time. The voltage across a cell 12 gradually increases until the cells 12 reaches full charge at point 80. Any further charging causes the voltage across the cell 12 to depress, as illustrated by the downwardly sloping portion 82 of the curve 78. When the voltage across the cells 12 drops by a predetermined amount from the peak voltage at point 80 to a predetermined voltage at point 81, the battery charger 10 discontinues charging in the fast charge cycle. Charging battery cells until the voltage drops by a predetermined amount from the peak voltage is known as "negative delta V" measurement.

Advantageously, the voltage peak at point 80 is detected while the cells 12 are being charged. Therefore, the voltage across the cells 12 is measured and averaged in block 84. The measured voltage from block 84 is compared to the previous measured voltage in block 86. If the new measured voltage is greater than the old measured voltage, then the voltage across the cells 12 is continuing to rise, and, therefore, has not reached the voltage peak at point 80. In this case, the new voltage measurement is temporarily stored as a "new" peak voltage in block 88 so that it can be compared with a subsequent voltage measurement.

Referring again to FIG. 5, after the "new" peak voltage is stored in block 88, control transfers to block 90 where the time of the fast charge cycle, kept by the timer 30, is compared to a predetermined time. This comparison limits the amount of time that the cells 12 can be charged in the fast charge cycle. If high current is delivered to the cells 12 for a long period of time, e.g., more than 12 hours, the cells 12 can exhibit problems such as "thermal runaway" where the cells 12 are damaged due to excessive current draw and overheating. However, as long as the fast charge cycle is under this maximum time limit imposed in block 90, control transfers back to block 84 so that the voltage across the cells 12 can again be measured and compared to the temporarily stored "new" peak voltage. If the voltage across the cells 12 continues to rise for the entire fast charging cycle, high charging current ceases to be delivered to the cells 12 in block 92. In block 94, a signal is sent to the LED 15 and causes the LED 15 to flash. This flashing LED 15 indicates that the cells 12 are charging too slowly and may be defective.

However, if the new voltage measurement from block 84 is less than the temporarily stored "new" peak voltage, control transfers to block 96. In this case, the "new" peak voltage is the real peak voltage at point 80. Therefore, this real peak voltage continues to be stored. In block 96, a preselected voltage, e.g., 20 millivolts, is added to the new measured voltage from block 84 to produce a summed voltage. The summed voltage is compared to the temporarily stored "new" peak voltage. If the real peak voltage is less than the new measured voltage plus 20 millivolts, control transfers to block 90.

If the fast charge cycle is still under the time limit, another new voltage measurement is taken block 84. Since the voltage across the cells 12 is now following section 82 of curve 78, the new voltage measurement should be less than the real peak voltage, so control transfers to block 96. Again, 20 millivolts is added to the new voltage measurement, and this voltage is compared to the real peak voltage. If the real peak voltage is greater than the summed voltage, the fast charge cycle ceases and control transfers to the trickle charge cycle (block 48). In the example, the 20 millivolts added to the new voltage measurement represents a charge of approximately 130% of a full charge when the summed voltage is equal to the peak voltage.

In the trickle charge cycle, the battery charger 10 maintains the charge on the cells 12. In block 98, the control 14 stops sending high current to the cells 12, and the extended charge cycle is allowed to begin if the external switch 52 is closed. In place of the high current, the control logic 14 causes the power supply to deliver low current, approximately 20 milliamps, to the cells 12 (block 100). This low current is sufficient to maintain the charge on the cells 12 as long as the device continues to be powered externally. Of course, any time the device is being driven solely by the cells 12, the battery charger 10 is inactive.

Apart from removing external power to the device, another way to end the trickle charge cycle is to enter the extended charge cycle. As previously mentioned, preferably the extended charge cycle is externally selected when the user of the device opens switch 52. Therefore, the control logic 14 monitors switch 52 in block 104. As long as switch 52 remains closed, block 104 transfers control to block 102 so that low current continues to be delivered to the cells 12. However, when the switch 52 is opened, block 104 transfers control to the extended charge cycle (block 50).

Figure 7:
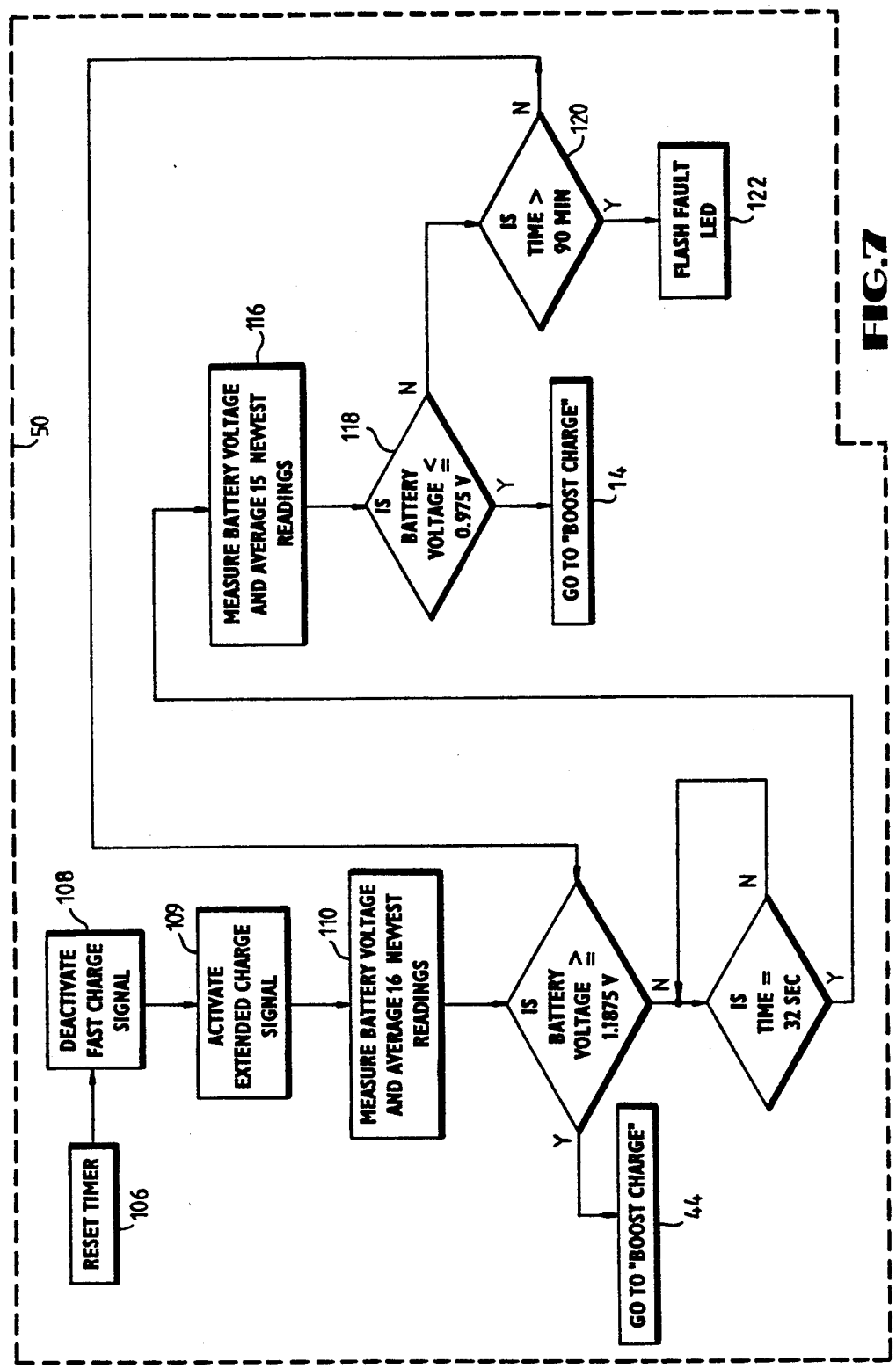
FIG. 7 is a flow chart that represents the extended charge cycle of a battery charger embodying the present invention.

The extended charge cycle is illustrated by the flow chart of FIG. 7. Upon entering the extended charge cycle, the timer 30 is reset in block 106 In block 108, the fast charge signal is disabled, and in block 109, the extended charge signal is activated. Logically, the fast charge cycle is disabled since the battery charger 10 cannot switch from the extended charge cycle 50 directly to the fast charge cycle (block 46), as illustrated by the state diagram of FIG. 2.

In the extended charge cycle, the power supply 16 loads cells 12 to, at least, partially discharge the cells 12. However, before discharging the cells 12, the battery charger 10 measures the voltage across the cells 12 (block 110), since it is unnecessary to discharge a fully charged cell. In block 112, the measured voltage is compared to a second preselected voltage that represents the maximum charge across each cell 12. For instance, if the voltage across each cell 12 is greater than approximately 80% of the nominal voltage, e.g., 1.1875 volts/cell, the battery charger 10 exits the extended charge cycle and initiates the boost charge cycle. However, if the voltage across each cycle 12 is less than 80% of the nominal voltage, the voltage across each cell 12 is again measured and averaged in block 116 after a 32 second delay imposed in block 114. In block 118, this measured voltage is compared to a third preselected voltage that represents a lower limit to which the cells 12 will be discharged. Preferably, this lower limit is approximately 60% of the nominal voltage across each cell 12.

When the cells 12 have been discharged to the lower limit, control transfers to the boost charge cycle so that the cells 12 will be recharged. However, until the voltage across the cells 12 reaches the lower limit, the voltage across the cells 12 continues to be measured every 32 seconds. If the cells 12 fail to discharge with a predetermined time limit, imposed in block 120, control transfers to block 122. In block 122, a signal is sent to the LED 15 and the LED 15 flashes a fault signal. The fault signal alerts the user that the cells 12 are not discharging properly.

As mentioned earlier, an ASIC preferably carries out the functions of the battery charger 10. FIGS. 8-24 represent logic circuits that generally perform these functions. Since ASICs are programmable gate arrays, the actual circuitry within an ASIC may not resemble the illustrated logic circuits Before explaining the logic circuits in FIGS. 9-20, it should be understood that a state machine logically performs the functions illustrated in FIG. 2. Referring to FIG. 8, a sequencer 140 receives signals from and delivers signals to the logic circuits in order to accomplish the functions of the battery charger 10. Input signals to the sequencer 140 include: an "extended cycle switch" signal on line 141, an "extended cycle end" signal on line 143, a "boost cycle end" signal on line 145, and a "fast cycle end" signal on line 147. In addition, the sequencer 140 receives a clock signal on line 149 and a reset signal on line 151. The sequencer 140 outputs a "trickle charge" signal on line 142, a "fast charge" signal on line 144, a "boost charge" signal on line 146, and an "extended charge" signal on line 148. In response to changing input signals, the sequencer 140 changes appropriate output signals to carry out the function of the state diagram illustrated in FIG. 2.

Referring now to FIG. 9, there is illustrated a logic circuit that controls reception of the measured voltage signal into the control logic 14. The A/D converter 18 digitizes the measured voltage across the cells 12 and outputs the digital signal on the data bus 20. The 10-bit signal that represents the voltage across cell 12 is received by an averager 150 on the data bus 20. The averager 150 accepts the signals on the data bus 20 in response to a clock signal and a "start" signal.

The clock signal is provided by a system clock signal (from the timer 30) that feeds a D flip/flop 152 on a line 154. The D flip/flop 152 receives the "A/D ready" signal on its data input from line 21. On the rising edge of ever clock signal, the "A/D ready" signal is latched by the D flip/flop 152. The D flip/flop 152 outputs the latched signal on line 156 which is connected to the clock input of the averager 150.

As described with reference to FIGS. 3-7, the voltage across the cells 12 is measured at prescribed intervals that vary from cycle to cycle. To enable the battery charger 10 to measure the voltage at these prescribed intervals, the averager 150 is also controlled by the "start" signal that is received on line 158. When the "start" signal changes from a logical "0" to a logical "1", the averager 150 accepts the data from the data bus 20. The averager 150 stores 16 consecutive signals from the data bus 20, and then outputs an averaged signal on a data bus 160. However, when the "start" signal is a logical "0" and 16 consecutive measurements have been made, the averager 150 does not accept further data signals from the data bus 20.

To provide the prescribed intervals, the timing of the "start" signal varies depending on which cycle the battery charger 10 is executing. An OR gate 162 receives several timing signals on lines 164 through 172. As illustrated, each signal received by the OR gate 162 is inverted before reception. Therefore, the output of the OR gate 162 on line 158 is a logical "1" if a logical "0" exists on any one of the lines 164-172. The circuitry that determines the state of the signals on the lines 164-172 is shown in FIGS. 10-15.

The signal on line 164 is initially a logical "1" for a short period, e.g., 2 seconds, and is received only when the boost charge cycle is initiated (see block 54). Thereafter the signal is a logical "0" for a short period, e.g., 0.02 milliseconds. This short pulse is delivered to the averager 150 so that it can accept sixteen signals from the databus 20 for averaging after the short period mentioned in block 54 of FIG. 4. Referring briefly to FIG. 10, the data port of a D flip/flop 176 receives the "boost charge" signal from the sequencer 140 on line 146. When the boost charge cycle is initiated, the "boost charge" signal is a logical "1". The D flip/flop 176 also receives a clock signal on line 178 that has a 50% duty cycle and a frequency of 0.25 hertz. The output of the D flip/flop 176 is connected to the data port of another D flip/flop 180 and to the input of a NAND gate 182. The complimentary output of the D flip/flop 180 is also connected to the NAND gate 182. The D flip/flop 180 receives a 50 kilohertz signal having a 50% duty cycle on its clock input on line 184.

Each D flip/flop 176 and 180 receives a reset signal on line 151 when the electronic device is powered on. Therefore, when the electronic device is initially powered on, the battery charger 10 enters the boost charge cycle, and delivers a logic "1" on line 178. However, until the first clock cycle, the output of the D flip/flop 176 on line 179 remains a logical "0" and the complimentary output of the flip/flop 180 remains a logical "1". Therefore, the NAND gate 182 outputs a logical "1". Since the D flip/flop 176 is receiving a clock signal having a frequency of 0.25 hertz, after 2 seconds the output of the D flip/flop 176 on line 179 changes to a logical "1". Therefore, the NAND gate 182 receives a logical "1" at each input, and outputs a logical "0". After 0.02 milliseconds (one 50 kilohertz clock cycle), the D flip/flop 180 accepts the logical "1" at its data input, and its complimentary output changes from a logical "1" to a logical "0".

A NAND gate 181 also receives the signal from line 179. As previously mentioned, the signal on line 179 is a logical "0" for two seconds, and a logical "1" thereafter. Therefore, the NAND gate 181 is disabled for two seconds after the electronic device is powered on and enabled thereafter. The NAND gate 181 also receives a signal from a NOR gate 183. The output of the NOR gate 183 on line 185 is inverted by the NAND gate 181 and passed to an SR flip/flop 187 when the NAND gate 181 is enabled. The output of the SR flip/flop 187 on line 19 controls the power supply 16. If the signal on line 19 is a logical "0", the power supply 16 delivers high current to the cells 12.

The signal on line 19 is controlled by the inputs to the NOR gate 183. All inputs to the NOR gate 183 are inverted. When the NOR gate 183 outputs a logical "0", the signal on line 19 is a logical "1", and when the NOR gate 183 outputs a logical "1", the signal on line 19 is a logical "0". The NOR gate 183 receives a reset signal on line 151 and a fault signal on line 337 (see FIG. 17). Therefore, whenever either of these signals is a logical "0", the signal on line 19 is a logical "1". However, in normal operation, both signals will be logical "1".

Therefore, the NOR gate 183 has another input from a NOR gate 189. The NOR gate 18 receives the "trickle charge" signal on line 142 and the "extended charge" signal on line 148. When both of these signals are a logical "0", the output of the NOR gate 189 is a logical "1". Therefore, when the battery charger 10 is in the boost charge cycle or the fast charge cycle, the output of the NOR gate 183 is a logical "1" and the output on line 19 is a logical "0". Hence, the cells 12 receive high current from the power supply 16 in the boost charge cycle and in the fast charge cycle.

The OR gate 162 of FIG. 9 also receives signals having a period of 64 seconds and a 50% duty cycle on lines 166 and 168. Referring briefly to FIG. 11, when the battery charger is in the fast charge cycle, the clock signal on line 166 is delivered by the illustrated circuit. A NAND gate 186 receives the "fast charge" signal on line 144, which is a logical "1" in the fast charge cycle, and a clock signal on line 190 having a period of 64 seconds and a 50% duty cycle. When the clock signal is a logical "1", the output of the NAND gate 186 is a logical "0"; when the clock signal is logical "0", the output of the NAND gate 186 is a logical "1". However, if the battery charger 10 is not in the fast charge cycle, line 144 of the NAND gate 186 remains at a logical "0". Therefore, the NAND gate 186 outputs a logical "1" regardless of the state of the clock signal.

Similarly, in the extended charge cycle, the voltage across the cells 12 is read every 32 seconds, as illustrated in block 114 of FIG. 7. Referring briefly to FIG. 12, a NAND gate 192 receives the "extended charge" signal, a logical "12", on line 148. On line 196, the NAND gate 192 receives a clock signal having a 50% duty cycle and a period of 64 seconds. Therefore, while the line 148 is at a logical "1", the output of the NAND gate changes from a logical "0" to a logical "1" every 32 seconds, like the circuit in FIG. 10. When the battery charger 10 is not in the extended charge cycle, the output of the NAND gate 92 remains at a logical "1".

Figure 13:
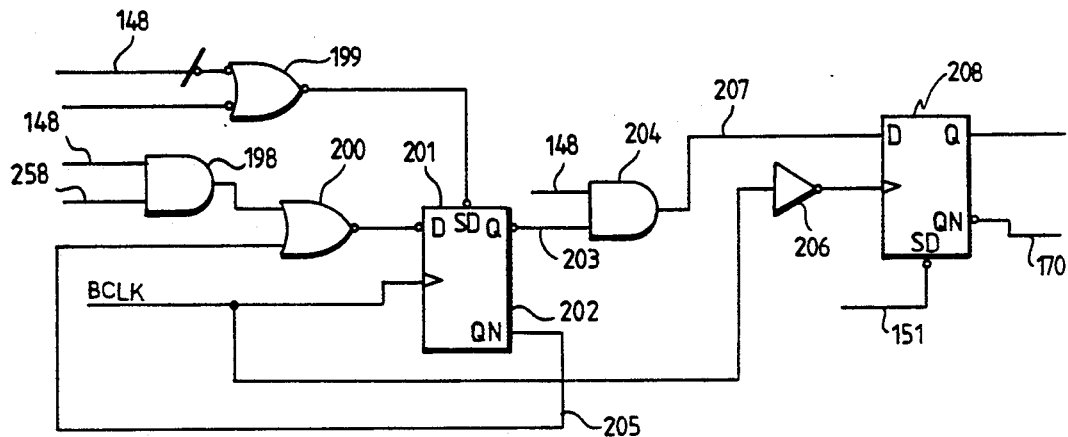
FIG. 13 is a logic circuit that generates state signals when the battery charger is executing the extended charge cycle.

The signal on line 170 is generated during the extended charge cycle by the circuit illustrated in FIG. 13. A D flip/flop 202 receives a signal on its "set" input 201 via a NOR gate 199. The NOR gate 199 receives a reset signal and the "extended charge" signal. The output of a D flip/flop 202 is a logical "1" if the reset signal is a logical "0" or if the "extended charge" signal is a logical "0". However, if the battery charger 10 is executing the extended charge cycle, the "extended charge" signal is a logical "1".

The "extended charge" signal is also received on one input of an AND gate 198. The other input of the AND gate 198 receives a signal from line 258 of FIG. 14 (described later) which indicates whether the measured voltage is less than the preselected voltage, as illustrated in block 112 of FIG. 7. This signal is normally a logical "0". Thus, when the battery charger 10 enters the extended charge cycle, the output of the AND gate 198 is a logical "0".

The output of the AND gate 198 is received by a NOR gate 200. Since the output of the AND gate 198 is a logical "0", the output of the NOR gate 200 is a logical "1". The output of the NOR gate 200 is received by the data input of flip/flop 202. When the data input is a logical "1", the D flip/flop 202 outputs a logical "1" on line 203 and a logical "0" on line 205. Line 203 is connected to an AND gate 204 that is enabled by the "extended charge" signal received on line 148. Line 205 is connected to the other input of the NOR gate 200.

The output of the AND gate 204 is delivered on line 207 and received by the data input of a D flip/flop 208. Therefore, the D flip/flop 208 outputs a logical "1" on its uncomplimented output and a logical "0" on its complimented output (line 170). When the signal on line 170 goes to a logical "0", the averager 150 accepts sixteen consecutive signals from the A/D converter 18 so that the comparison in block 112 of FIG. 7 can be made.

The output of D flip/flop 208 remains at a logical "0" until the signal on line 258 changes from a logical "0" to a logical "1". This change occurs if the measured voltage is less than the preselected voltage in block 112 of FIG. 14. (If the measured voltage is greater than the preselected voltage, the battery charger 10 exits the extended charge cycle and enters the boost charge cycle.) In response to this change, the output of the AND gate 198 becomes a logical "1", and the output of the NOR gate becomes a logical "0". The D flip/flop outputs a logical "0" on line 203 and a logical "1" on line 205. The logic change on line 203 and 205 causes a different preselected voltage, e.g., 0.975 V, to be used for the next comparison. (See block 118 of FIG. 7.) The AND gate 204 outputs a logical "0", and the D flip/flop outputs a logical "1" on line 170. Therefore, the output of the OR gate 162 becomes a logical "0", and the averager 150 will not accept any data until 32 seconds later when another pulse is received. Thereafter, the averager 150 will accept sixteen measured voltage signals to average. This new averaged voltage is used for the next iteration of the flowchart of FIG. 7.

A NAND gate 210 delivers the last input to the OR gate 162 on line 172. The inputs to the NAND gate 210 are (1) a clock signal having a 180 minute period and a 50% duty cycle on line 212, and (2) the "boost charge" signal on line 146. When the "boost charge" signal is a logical "1" and the clock signal is a logical "1", the output of the NAND gate 210 on line 172 is a logical "0". This signal is inverted at the input of the OR gate 162 so that the OR gate outputs a logical "1". Then, the averager 150 can accept sixteen digital signals from the data bus 20. When the clock signal switches to a logical "0", the output of the OR gate 162 switches to a logical "0", so that the averager 150 will not accept any signal from the data bus 20.

Referring again to FIG. 9, when the "start" signal coincides with the clock signal, the averager 150 outputs an averaged signal onto a data bus 160. Data from the data bus 160 is received by the logic circuits that perform the functions in the various charging cycles. These logic circuits are illustrated in FIGS. 14-24.

Figure 14:
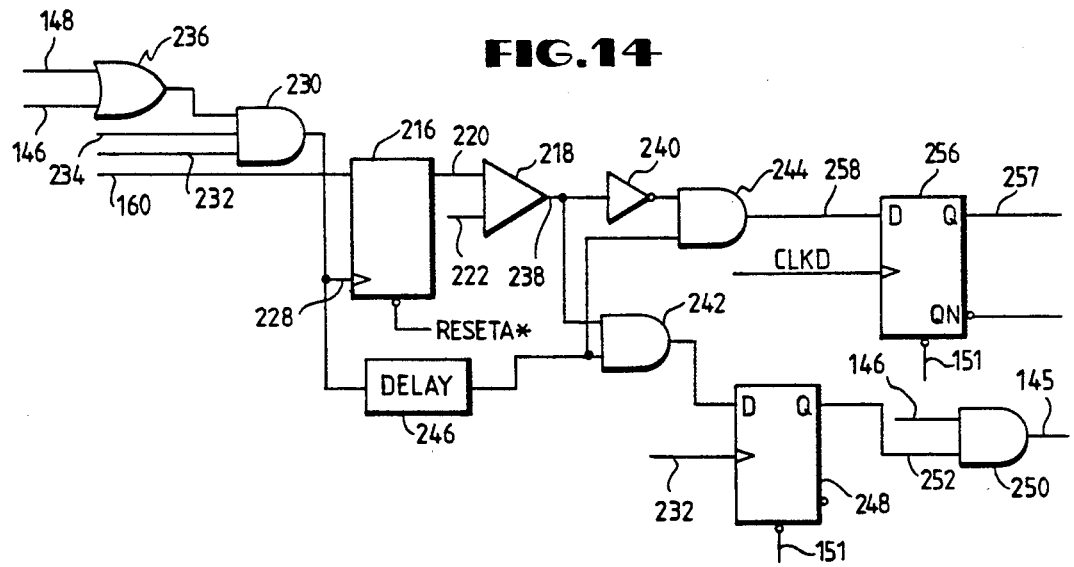
FIG. 14 is a logic circuit embodying the boost charge cycle illustrated in FIG. 4 and the extended charge cycle illustrated in FIG. 7.

Referring first to FIG. 14, the logical circuit for performing the boost charge and the extended charge cycles is illustrated. The data bus 160 is connected to the input of a 10-bit register 216. The register 216 stores the output of the averager 150 so that a digital comparator 218 can compare the averaged data signal to a preselected voltage signal from data bus 222. In the extended charge cycle, a measured voltage is compared to a preselected voltage at two different times. The first comparison determines whether the cells 12 are too highly charged to be efficiently discharged (block 112 of FIG. 7), and the second comparison determines whether the discharging cells 12 have reached a lower charge limit (block 118 of FIG. 7). In the boost charge cycle, a measured voltage is compared to a preselected voltage to determine if the cells 12 contain a minimum charge (block 58 of FIG. 4). Therefore, the digital voltage signal on data bus 222 depends upon which cycle the battery charger 10 is executing.

Figure 15:
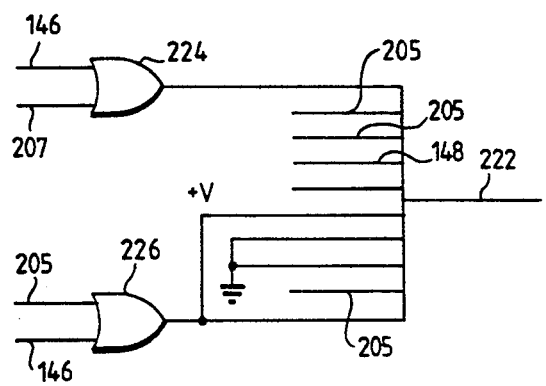
FIG. 15 is a logic circuit that provides a preselected voltage in the extended charge cycle and in the boost charge cycle.

Referring briefly to FIG. 15, a logic circuit for changing the digital signal on the data bus 222 is illustrated. Since two comparisons are made in the extended charge cycle, the extended charge cycle operates in two states, state "A" and state "B". An OR gate 224 receives the state "A" signal from line 207 (FIG. 13) and the "boost charge" signal from line 146. An OR gate 226 receives the state "B" signal from line 205 (FIG. 13) and the "boost charge" signal. The output of the OR gate 224 is the most significant bit on the 10-bit data bus 222. The output of the OR gate 226 is the least significant bit of the data bus 222 and also the fifth bit on the data bus 222. The second, eighth, and ninth bits carry the state "B" signal, and the seventh bit carries the "extended charge" signal. The third and fourth bits carry a logical "0" signal, and the sixth bit carries a logical "1" When the battery charger 10 is in the boost charge cycle, the digital signal on the data bus 222 represents 1.1 volts. When the battery charger is in state "A" of the extended charge cycle, the digital signal on the data bus 222 represents 1.1875 volts. Finally, when the battery charger 10 is in state "B" of the extended charge cycle, the digital signal on the data bus 222 represents 0.975 volts.

Referring again to FIG. 14, since the illustrated circuit operates only when the battery charger 10 is executing the extended charge cycle or the boost charge cycle, the register 216 is enabled only during these cycles. The register 216 includes a clock input 228 which is connected to the output of an AND gate 230. The AND gate receives a clock signal on line 232. The AND gate 230 also receives an "average ready" signal from the averager 150 on line 234. If the averaged voltage measurement on data bus 160 is stable, the averager 150 outputs a logical "1" on line 234 to indicate to other circuitry that the averaged signal on data bus 160 may be read.

The AND gate 230 further receives an input from the output of an OR gate 236. The OR gate 236 receives the "extended charge" signal on line 148 and the "boost charge" signal on line 146. Therefore, the OR gate 236 outputs a logical "1" if the battery charger 10 is in the extended charge cycle or the boost charge cycle. If the battery charger 10 is in another cycle, then the "extended charge" signal and the "boost charge" signal are logical "0", and, thus, the output of the OR gate 236 is a logical "0". If any of the inputs to the AND gate 230 are a logical "0", then the output of the AND gate remains at a logical "0". If the output of the AND gate 230 remains at a logical "0", then the register 216 cannot accept data from the data bus 160.

The comparator 218 outputs a logical "1" if the averaged signal is greater than the preselected signal, and a logical "0" if the averaged signal is less than the preselected signal. The output of the comparator on line 238 is delivered to an invertor 240 and to an AND gate 242. The output of the invertor 240 is delivered to an AND gate 244. The AND gates 242 and 244 also receive a data signal from a delay circuit 246.

The delay circuit 246 receives an input signal from the output of the AND gate 230. The output from the comparator 218 on line 238 cannot be received by subsequent circuitry until the output of the delay circuit 246 is a logical "1" so as to enable the AND gates 242 and 244. The delay circuit 246 gives the asynchronous comparator 218 time to sequentially compare the two digital signals from lines 220 and 222.

The output of the AND gate 242 is delivered to a D flip/flop 248. The D flip/flop 248 latches the output from line 238, and delivers the output from line 238 to an AND gate 250. The AND gate 250 is enabled by the "boost charge" signal on line 146. Therefore, if battery charger 10 is in the boost charge cycle, e.g., the "boost charge" signal is a logical "1", then the output of the AND gate 250 will not be a logical "1" unless the averaged signal is greater than the preselected signal. If the output of the AND gate 250 is a logical "1", the output is a "boost end" signal which is received on line 145 of the sequencer 140. In the boost charge cycle, if the averaged signal is greater than the preselected signal then the sequencer 140 switches the battery charger 10 from the boost charge cycle to the fast charge cycle.

The output of the AND gate 244 is delivered to a D flip/flop 256 on line 258. Since the signal from line 238 has been inverted by the invertor 240, the signal on line 258 is the logical compliment of the signal on line 252. Therefore, the D flip/flop 256 latches the complimentary signal and outputs it on line 257. The signal on line 257 is a logical "1" when the averaged signal is less than the preselected signal. As can be seen in block 118 of FIG. 7, if the measured voltage is less than a preselected voltage then the boost charge cycle is ended.

Figure 5:
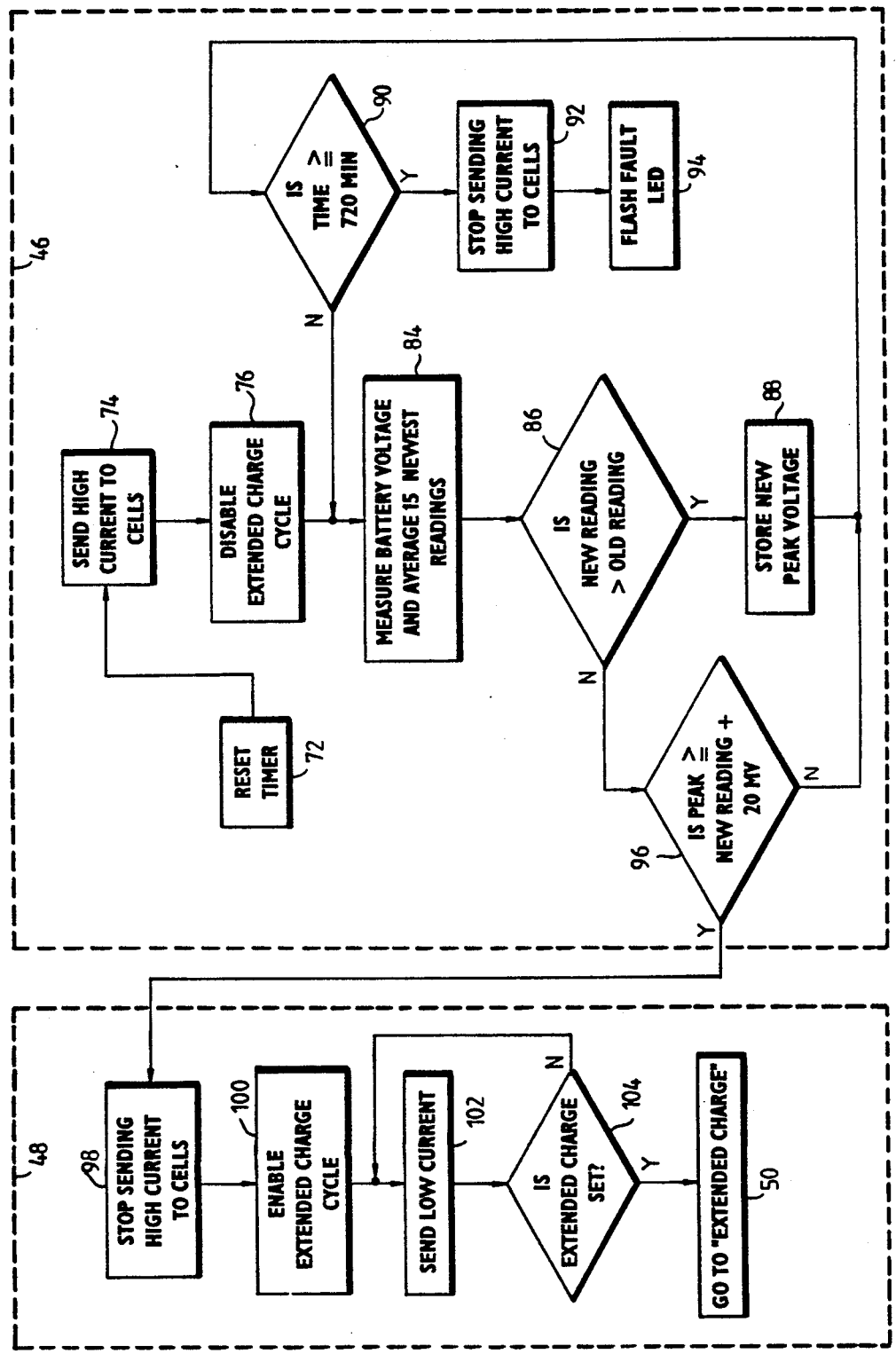
FIG. 5 is a flow chart that represents the fast charge cycle and the trickle charge cycle of a battery charger that embodies the present invention.
Figure 16:
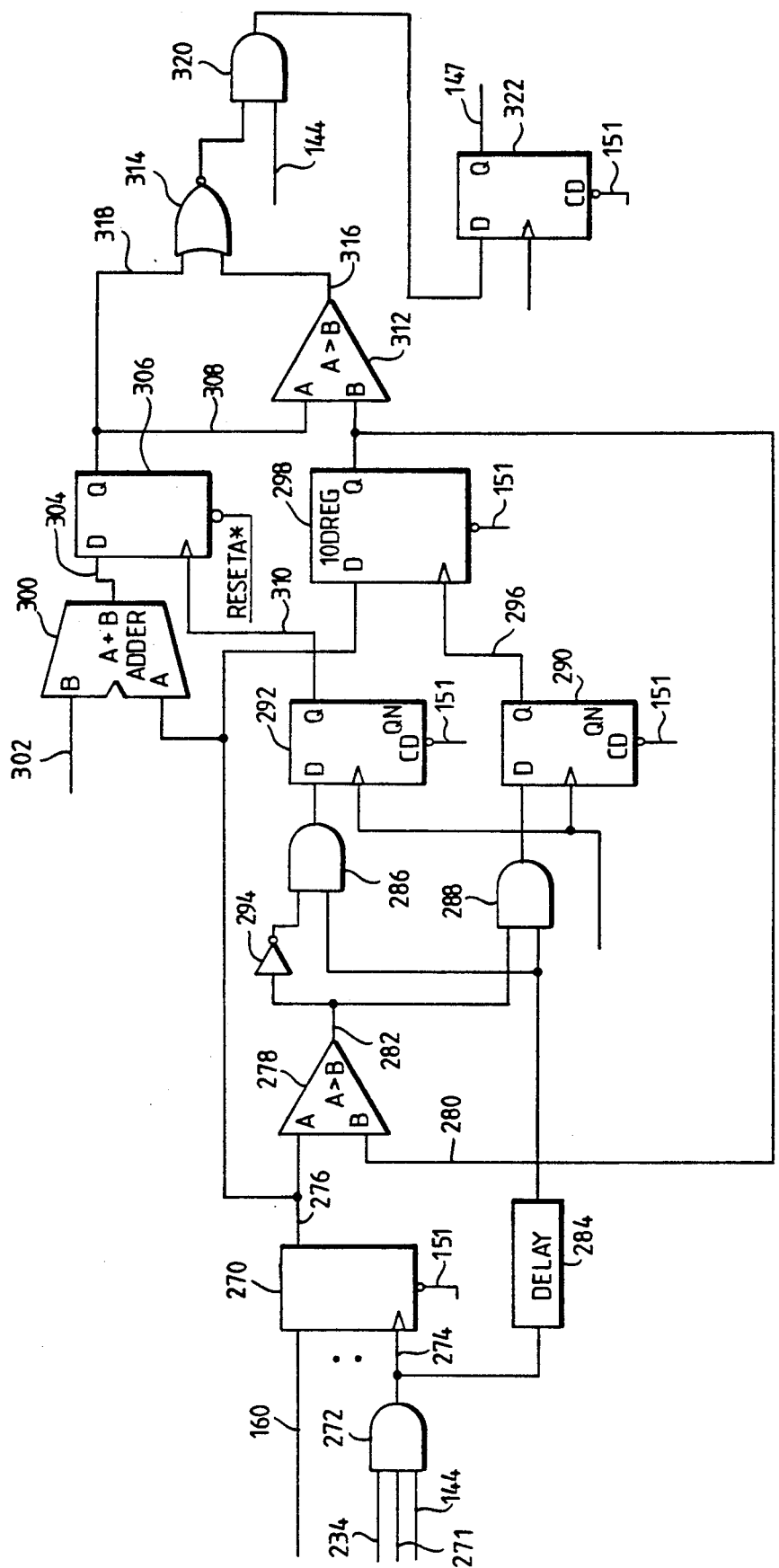
FIG. 16 is a logic circuit embodying the fast charge cycle illustrated in FIG. 4.

Referring now to FIG. 16, the logic circuit carries out the functions of the fast charge cycle set forth in the flow chart of FIG. 5. As previously mentioned in reference to FIG. 14, the OR gate 236 and the AND gate 230 disable the circuit of FIG. 14, unless the battery charger 10 is executing the extended charge cycle or the boost charge cycle. Therefore, in the fast charge cycle, the circuit of FIG. 9 delivers an averaged signal to a register 270 on the data bus 160 of FIG. 16 instead of to the register 216.

The register 270 is controlled by an AND gate 272. The output of the AND gate 272 is connected to the clock input of the register 270 via a line 274. The inputs to the AND gate 272 include the "average ready" signal from line 234, a clock signal, and the "fast charge" signal from the sequencer 140 on line 144. When the battery charger 10 is executing the fast charge cycle, the fast charge signal is a logical "1". Thus, the AND gate 272 is enabled only when the battery charger 10 is executing the fast charge cycle. If the fast charge signal and the "average ready" signal are both at a logical "1", then the rising edge of a clock pulse received on line 271 causes the register 270 to accept data from the data bus 160.

The register 270 latches the averaged signal from the data bus 160 and outputs the latched signal on a data bus 276. A digital comparator 278 receives the latched signal on the data bus 276, and compares this signal to a temporary peak signal on data bus 280. The comparator 278 outputs a logical "1" if the signal on line 276 is greater than the signal on line 280, and a logical "0" if the signal on line 276 is less than the signal on line 280.

Since the comparator 278 is similar to the comparator 218, in that both are preferably asynchronous, the logical circuit of FIG. 16 includes a delay circuit 284 that is similar to the delay circuit 246. After a short delay to allow the output 281 of the comparator 278 to stabilize, the delay circuit 284 outputs a logical "1", thus enabling AND gates 286 and 288. The AND gate 288 passes the output of the comparator 278 to a D flip/flop 290. The AND gate 286 passes the compliment of the output of the comparator 278 to a D flip/flop 292, since an invertor 294 inverts the signal from line 282.

If the signal on line 276 is greater than the signal on line 280, then the D flip/flop 290 outputs a logical "1" onto line 296 which is connected to the clock input of a register 298. Data bus 276 is connected to the data input of register 298 so that the register 298 receives the measured signal. Therefore, every time the new reading is greater than the old reading (see block 86 of FIG. 5), the register 298 outputs the new reading on data bus 280 so that it can be compared to the next reading on data bus 276. In other words, the register 298 stores the temporary peak voltage as suggested in block 88 of FIG. 5.

While the signal on data bus 276 is greater than the signal on data bus 280, the register 298 stores successively higher peak values since the curve 78 of FIG. 6 continues to rise. However, when the peak at point 80 on curve 78 is reached and exceeded, the signal on data bus 280 will be greater than the signal on data bus 276. Therefore, the output of the comparator 278 will be a logical "0". This logical "0", is delivered to the register 298 via line 296, and, thus, prevents the register 298 from storing subsequent signals. Instead, the register 298 continues to store the last value from data bus 276 that was greater than the value from line 280, i.e., the peak voltage represented by point 80 on curve 78. New voltage readings continue to be received from data bus 160 and transferred to data bus 276, and the comparator 278 continues to compare the newly measured voltages to the preceding measured voltages to insure that the curve 78 is decreasing along section 82. However, as long the curve 78 is decreasing, the peak voltage stored in register 298 remains unchanged.

Once the peak is found, control transfers to block 96 where the peak is compared to subsequent voltage readings, after a predetermined voltage, e.g., approximately 20 millivolts, has been added to the subsequent measured voltage. An adder 300 receives the measured voltage from data bus 276. The adder 300 adds the digital equivalent of about 20 millivolts from data bus 302 to the measured voltage on data bus 276. The adder 300 then outputs the summed signal onto data bus 304.

A register 306 receives the summed signal from data bus 304, and outputs the summed signal onto data bus 308 in response to receiving a clock signal on line 310. When the signal on data bus 276 is less than the signal on data bus 280, the D flip/flop 292 outputs a logical "1" onto line 310. Therefore, the register 306 is inactive until the voltage across the cells 12 begins to drop, as illustrated by section 82 of curve 78.

A digital comparator 312 compares the summed signal on data bus 308 to the peak signal on data bus 280. If the peak signal is greater than the summed signal, the comparator 312 outputs a logical "0" that is received by a NOR gate 314 via line 316. In this phase of the fast charge cycle, the NOR gate 314 is enabled by a logical "0" delivered from the most significant bit of the 11-bit register 306 on line 318. If the most significant bit is a logical "1", the signal on line 308 is greater than the signal on line 280. Only when the most significant bit is a logical "0" that the comparator 312 is needed for comparing the signal on line 308 to the signal on line 280. Therefore, the NOR gate 314 delivers a logical "1" to an AND gate 320 which is enabled by the "fast charge" signal on line 144. The AND gate 320 delivers a logical "1" to a D flip/flop 322 which outputs a "fast end" signal on line 147 to the sequencer 140. The sequencer 140 causes the battery charger 10 to change state when the "fast end" signal changes from a logical "0" to a logical "1".

When the signal on data bus 308 is greater than the signal on data bus 280, the comparator 312 outputs a logical "1" onto line 316. Therefore, the NOR gate 314 outputs a logical "0" to the AND gate 320 which passes the logical "0" to the D flip/flop 322. The D flip/flop 322 passes the logical "0" on line 147 to the sequencer 140, which does not change states.

Figure 17:
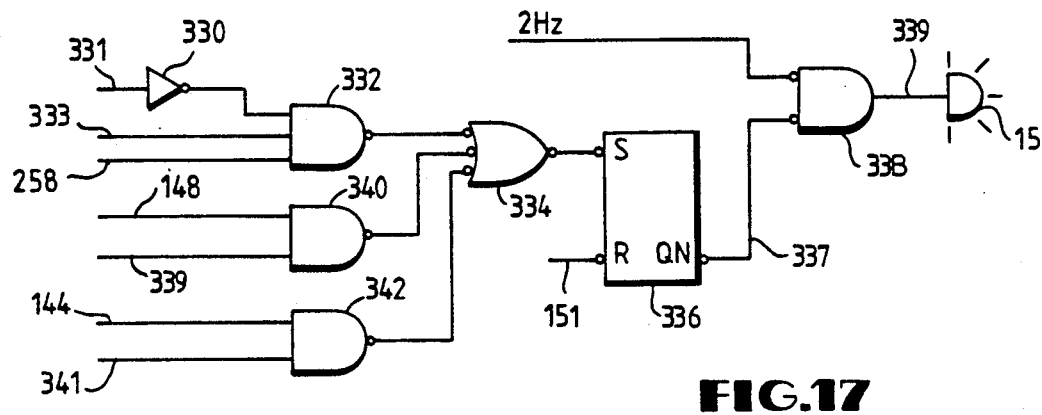
FIG. 17 is a logic circuit that generates a fault signal.

FIG. 17 illustrates a circuit that processes fault signals and causes an associated LED 15 to flash. In the boost charge cycle, if the cells 12 are not capable of being recharged within the predetermined time limit set in block 62, then the invertor 330 receives a logical "0" on line 331 and outputs a logical "1" to enable a NAND gate 332. The NAND gate 332 also receives a clock signal on line 333 and a logical "1" on line 258 if the measured signal is less than the predetermined voltage signal in block 66 of FIG. 4. The output of the NAND gate 332 is gated through a NOR gate 334 to an SR flip/flop 336. The complimentary output of the SR flip/flop 336 is inverted and delivered an AND gate 338. The AND gate 338 also receives a 2 hertz signal so that the output of the AND gate 338, which is connected to the LED 15, vacillates at 2 hertz if the output from the SR flip/flop 336 is a logical "0".

In the extended charge cycle, a NAND gate 340 receives the "extended charge" signal, which is a logical "1", on line 148. If the cells 12 have not been sufficiently discharged within the predetermined time limit set forth in block 120 of FIG. 7, the other input 339 to the NAND gate 340 goes from a logical "0" to a logical "1". Thus, the NOR gate 334 delivers a logical "0" which is inverted and delivered to the set input of the set-reset (SR) flip/flop 336. This causes the complimentary output of the SR flip/flop 336 on line 337 to change from a logical "1" to a logical "0". This signal is inverted and delivered to the AND gate 338, and, thus, the output of the AND gate 338 cause the LED 15 to flash.

In the fast charge cycle, a NAND gate 342 receives the "fast charge" signal on line 144 which is a logical "1". If the cells 12 do not recharge within the predetermined time limit set forth in block 90 of FIG. 5, then the other input to the NAND gate 342 on line 341 changes from a logical "0" to a logical "1". Therefore, the NAND gate 342 outputs a logical "0" to the NOR gate 334. The NOR gate 334 causes the fault signal to be delivered at the output of AND gate 338 as previously described.

Figure 18:
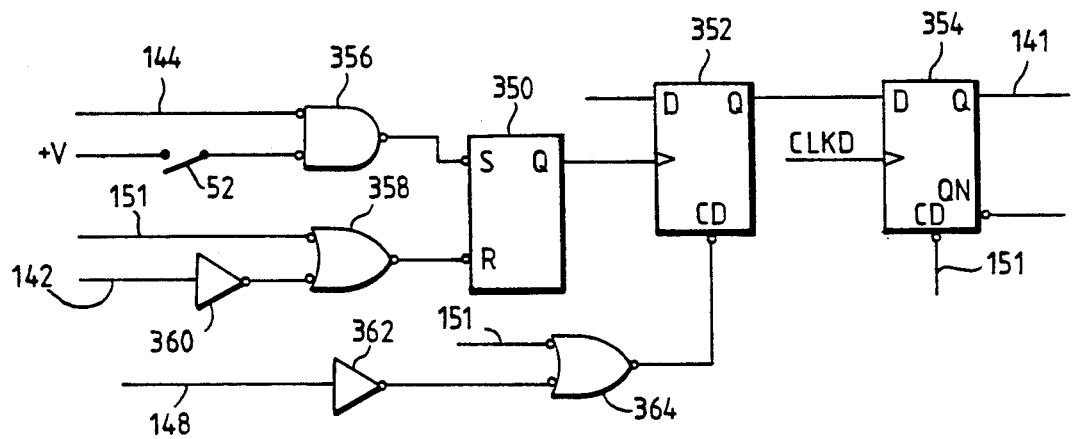
FIG. 18 is a logic circuit that generates a signal that begins the extended charge cycle.

FIG. 18 illustrates a logic circuit that generates the "extended cycle switch" signal on line 141 to begin the extended charge cycle. The extended charge cycle can be initiated by opening the switch 52 This signal along with the "fast charge" signal on line 144 are received by a NAND gate 356. If the "fast charge" signal is a logical "0", upon receipt of the external signal from the switch 52, the output of the NAND gate 356 changes to a logical "0" and sets an SR flip/flop 350. The output of the SR flip/flop 350 is connected to the clock input of a D flip/flop 352. Since its data input is connected to a positive voltage +V, the output of the D flip/flop 352 changes to a logical "1". A D flip/flop 354 synchronizes the output of the D flip/flop 352 to the main clock. Once the output of D flip/flop 354 on line 141 changes to a logical "1", the sequencer 140 changes the state of the battery charger 10 into the extended charge cycle.

In the extended charge cycle, the flip/flops 352 and 354 are reset. Therefore, the "extended charge" signal is inverted by an invertor 362, and delivered to a NOR gate 364. The NOR gate 354 and the D flip/flop 354 also receive a reset signal on line 151. The output of the NOR gate 364 delivers a reset signal to the D flip/flop 352 in response to receiving the a logical "1" on line 148 or a logical "0" on line 151.

Once the extended charge cycle is finished, it is preferable that the battery charger 10 will not reexecute the extended charge cycle until the boost charge and the fast charge cycles are finished. Therefore, the NOR gate 358 allows the extended charge cycle to be selected again only after the battery charger 10 enters the trickle charge cycle. The "trickle charge" signal on line 142 is inverted by an invertor 360 and received by the NOR gate 358. The NOR gate 358 also receives a reset signal on line 151. The output of the NOR gate 358 delivers a reset signal to the D flip/flop 350 in response to receiving the a logical "1" on line 142 or a logical "0" on line 151.

Figure 19:
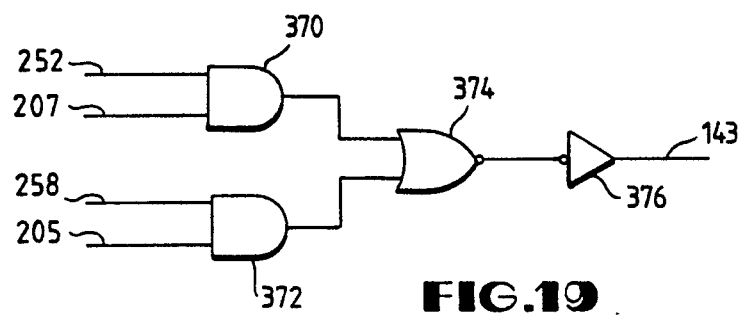
FIG. 19 is a logic circuit that generates a signal that ends the extended charge cycle.

FIG. 19 illustrates a logic circuit that generates the "extended charge end" signal on line 143 to exit the extended charge cycle. To exit the extended charge cycle, the battery charger 10 satisfies one of two conditions. First, the charger is in state "A" and the measured voltage is greater than the preselected voltage, e.g., 1.1875 volts, or, second, the battery charger 10 is in state "B" and the measured voltage is less than the preselected voltage, e.g., 0.9 volts. Therefore, an AND gate 370 receives the signals from lines 207 and 252, and an AND gate 372 receives the signals from lines 205 and 258. If either pair of signals are both a logical "1", then the respective AND gate 370 or 372 outputs a logical "1" to a NOR gate 374. The NOR gate 374 outputs a logical "0" that is inverted to a logical "1" by and invertor 376 and output on line 143.

The battery charger 10 can also be tested to determine if it is functioning properly. In addition to operating in its normal mode described above, the battery charger 10 can operate in various testing modes. Testing circuitry can place the battery charger 10 in (1) status mode to determine which cycle the battery charger 10 is executing, (2) logic test mode to determine if the control logic 14 is functioning properly, and (3) peripheral test mode to determine if the A/D convertor 18 and the timer 30 are functioning properly.

The various modes are selected using external switches 380 and 382. The switch 380 generates a "test A" signal and the switch 382 generates a "test B" signal. When a switch 380, 382 is closed, it generates a logical "1" since the switches 380 and 382 are connected to a positive voltage source +V. Similarly, when a switch 380, 382 is open, it generates a logical "0". If the switches 380 and 382 are both closed, the battery charger operates in its normal mode.

Figure 20:
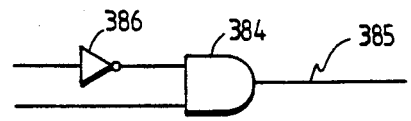
FIG. 20 is a logic circuit that generates a status mode signal.

FIG. 20 illustrates a logic circuit that receives the "test A" signal and a "test B signal" from the external switches 380 and 382. The averager 150 receives the output of an AND gate 384 on line 385. The output of the AND gate 384 determines whether the battery charger 10 is in the status mode or its normal charging mode. To select the status mode, the "test A" signal is a logical "0", i.e., switch 380 is opened, and the "test B" signal is a logical "1", i.e., switch 382 is closed. In the status mode, the output of the AND gate 384 is a logical "1", since the "test A" signal is inverted by the invertor 386. In the other modes, the output of AND gate 384 is a logical "0".

Figure 21:
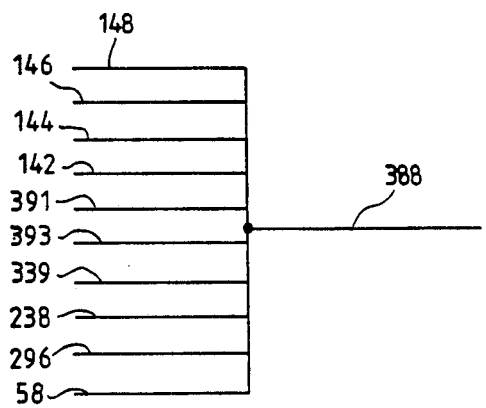
FIG. 21 illustrates signals on a data bus for use in the status mode.
Figure 22:
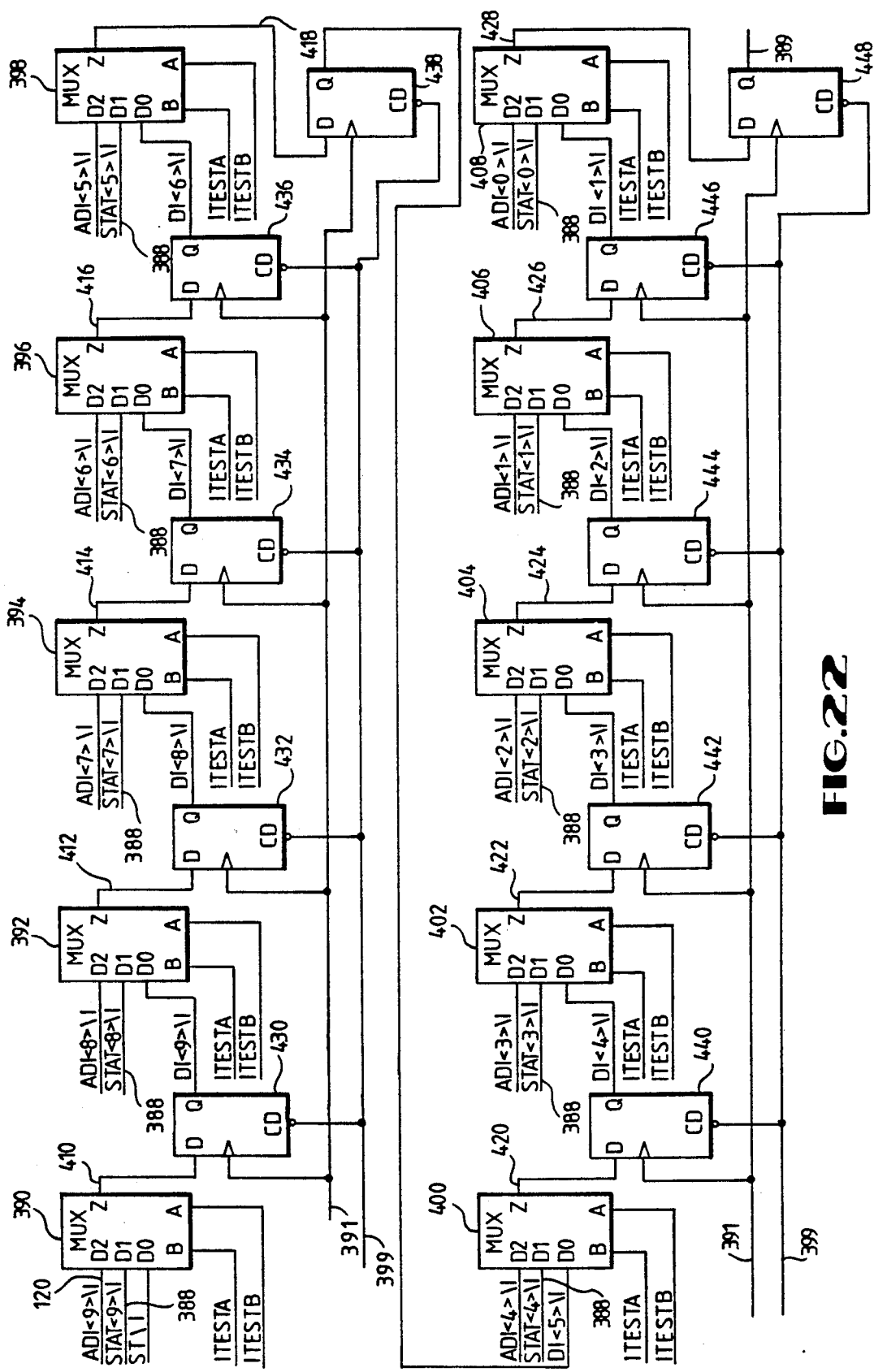
FIG. 22 is a logic circuit used for testing the batter charger.

When the output of the AND gate 384 is a logical "1", a data bus 388, illustrated in FIG. 21, is connected to a test circuit, illustrated in FIG. 22. The data bus 388 is preferably a 10-bit data bus. The data bus 388 carries selected signals to the test circuit, so that an external monitor (not shown) that is connected to the output 389 of the test circuit can determine the status of the battery charger 10. These selected signals include: the "extended charge" signal from line 148, the "fast charge" signal from line 144, the "boost charge" signal from line 146, the "trickle charge" signal from line 142, the "battery present" signal from line 17, the high current signal from line 393, the fault signal from line 339, the external charge initiation signal from the switch 52, the output of the comparator 218 from line 238, and the output of the D flip/flop 290 from line 296. By looking at these signals on the external monitor, the status of the battery charger 10 can be determined.

The test circuit illustrated in FIG. 22 forms a parallel-to-serial converter. The circuit receives one line the data bus 388 on a respective multiplexor 390-408. The two select inputs of each multiplexor 390-408 receive the "test A" and the "test B" signals. In the status mode, each multiplexor 390-408 selects the input that is receiving a line of the data bus 388. Therefore, each multiplexor 390-408 outputs the signal from the data bus 388 on a respective output line 410-428. Each output line 410-428 is received at the data input of a respective D flip/flop 430-448. In response to a predetermined number of successive clock signals delivered on line 391, the circuit delivers a serial output on line 389 which is connected to the external monitor. The circuit may be reset by a reset signal on line 399.

In the peripheral test mode, the circuit of FIG. 22 also receives digital signals from the databus 20. Preferably, the A/D converter 18 is disconnected from the cells 12 and known analog signals are input to the converter 18. The circuit of FIG. 22 receives a respective line of the databus 20 on the multiplexors 390-408. The two select inputs of each multiplexor 390-408 receive the "test A" and the "test B" signals. In the peripheral test mode, each multiplexor 390-408 selects the input that is receiving a digital signal on the databus 20. Therefore, each multiplexor 390-408 outputs the signal from its respective line 20 on a respective output line 410-428. Each output line 410-428 is received at the data input of a respective D flip/flop 430-448. In response to a predetermined number of successive clock signals delivered on line 391, the circuit delivers a serial output on line 389 which is connected to the external monitor.

Figure 23:
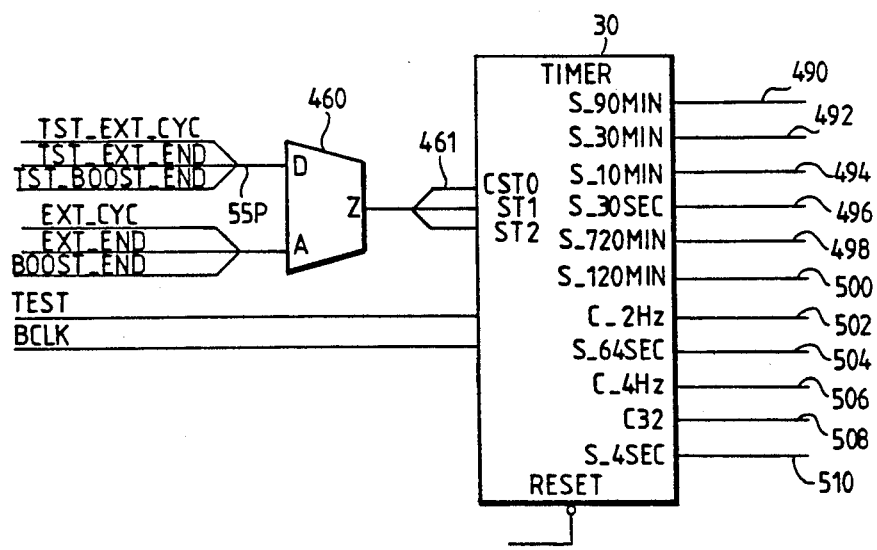
FIG. 23 is a logic circuit that controls the delivery of test inputs or normal inputs to the timer.

To test the reset capability of the timer 30, a multiplexor 460, illustrated in FIG. 23, is connected to deliver either the signals from lines 141, 143 and 145 or external signals from lines 141', 1434' and 145'. The external signals on lines 141', 143' and 145' are test signals that are delivered to the timer 30 instead of the signals on line 141, 143 and 145 when the battery charger 10 is in any one of the test modes. Since the certain logical changes in the real signals received on lines 141, 143 and 145 will reset the timer 30, the logic of the external signals on lines 141', 143' and 145' is changed to determine if the timer 30 resets.

Figure 24:
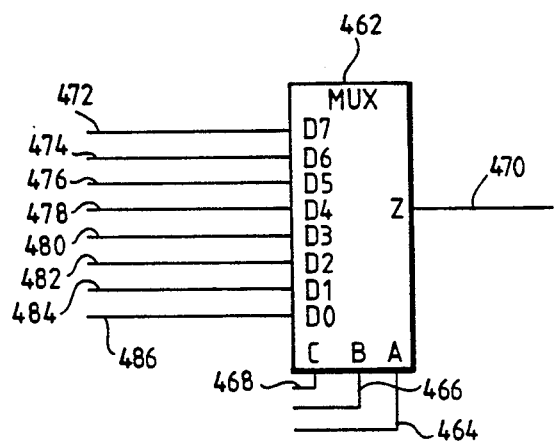
FIG. 24 illustrates inputs to a multiplexor for use in testing clock signals delivered by the timer.

To test the outputs of the timer 30, selected clock signals from the timer 30 are delivered to a multiplexor 462 on lines 472-486, as illustrated in FIG. 24. As illustrated, the multiplexor 462 is an 8-to-1 multiplexor that is controlled by three select lines 464, 466 and 468. The output of the multiplexor on line 470 is preferably connected to the external monitor so that the various clock signals on lines 472-486 can be view individually to insure that they are proper. The timer 30 delivers eleven clock signals on lines 490-510 having periods varying from four seconds to twelve hours.

Figure 25:
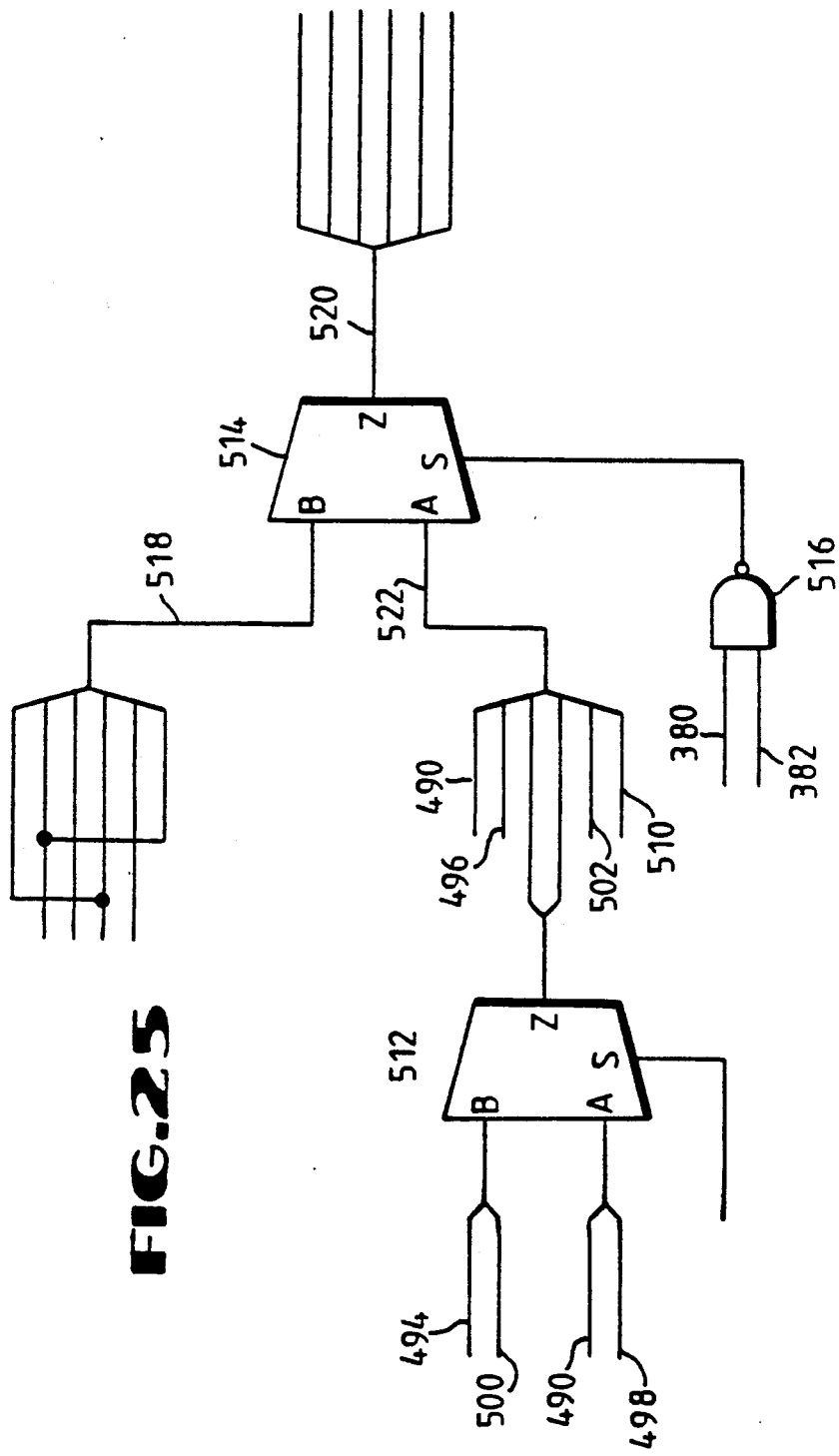
FIG. 25 is a logic circuit delivers signals from the timer or external signals to the control logic.

In the logic test mode, the various clock signals that provide the predetermined time limits are replaced by external clock signals to provide shorter time limits. Clearly, the user of the electronic device could not wait 90 minutes to 12 hours to determine if the peripherals or the logic are functioning properly. FIG. 25 illustrates a logical circuit that receives signals from the timer 30 on multiplexors 512 and 514, and external clock signals on the multiplexor 514. The "test A" and "test B" signals are received by a NAND gate 516, and the output of the NAND gate 516 is connected to the select input of the multiplexor 514. In response to the output of the NAND gate 516, the multiplexor 514 will deliver the external clock signals from the databus 518 onto the databus 520, or the clock signals from the timer 30, on databus 522, onto the databus 520. In the normal mode, the test "test A" and "test B" signals are a logical "1", so the NAND gate 516 outputs a logical "0". Therefore, the multiplexor 514 delivers clock signals from the timer 30 onto the databus 520. However, in any other mode, the NAND gate 516 outputs a logical "1", and the multiplexor 514 delivers the external clock signals from data bus 518 onto the databus 520. The databus 520 distributes the clock signals to the control logic 14. Therefore, the external clock signals may be used to simulate the actual clock signals in order to test the control logic 14.

We claim:

1. A battery charger, comprising:
   a battery;
   means coupled to said battery for monitoring the voltage of said battery, said voltage monitoring means including:
   an analog-to-digital converter coupled to said battery to detect analog voltage across said battery and to provide a digital voltage signal correlative to said detected analog voltage; and
   a voltage averager coupled to said digital voltage signal for sampling said digital voltage signal a plurality of times providing a plurality of corresponding digital voltage values, said voltage averager storing said plurality of corresponding digital voltage values and providing an averaged digital voltage signal which is the average of said plurality of digital voltage values;
   means coupled to said voltage monitoring means for providing a boost charge signal if the voltage of said battery is below a first predetermined voltage level;
   means coupled to said boost charge signal for charging said battery at a first preselected rate in response to said boost charge signal;
   a timer; and
   means coupled to said timer, said charging means and said voltage monitoring means for terminating the charging of said battery at said first preselected rate and for indicating a fault condition if the voltage of said battery is not greater than said first predetermined level after said battery has charged at said first preselected rate for a first predetermined time period.

2. The battery charger of claim 1, wherein said voltage monitoring means further comprises:
   a comparator having a first and a second input, said first input coupled to said averaged digital voltage signal and said second input coupled to a digital reference signal, said comparator having an output for providing a signal indicative of said averaged digital voltage signal being greater or less than said digital references voltage.

3. The battery charger of claim 2, further including:
   means for receiving an extended charge signal provided externally;
   means coupled to said extended charge signal and said voltage monitoring means for partially discharging said battery in response to said extended charge signal if the voltage of said battery is above a second predetermined level, wherein said battery is discharged until the voltage of said battery reaches a third predetermined level, said second predetermined level being greater and said third predetermined level being less than said first predetermined level.

4. The battery charger of claim 3, further comprising:
   a voltage reference circuit coupled to said boost signal, said extended charge signal, a mode A signal and a mode B signal, for providing said digital reference signal,
   wherein said digital reference signal corresponds to said first predetermined level if said boost signal is being received, said digital reference signal corresponds to said second predetermined level if said extended charge signal and said mode A signal are being received, and said digital reference signal corresponds to said third predetermined level if said extended charge signal and said mode B signal are being received.

5. A battery charger, comprising
   a battery;
   means coupled to said battery for monitoring the voltage of said battery;
   means coupled to said voltage monitoring means for providing a boost charge signal if the voltage of said battery is below a first predetermined voltage level;
   means coupled to said voltage monitoring means for providing a fast charge signal if the voltage level of said battery is above said first preselected level;
   means coupled to said voltage monitoring means for providing a trickle charge signal if the voltage of said battery is above a second predetermined level, wherein said second predetermined level is greater than said first predetermined level;
   means coupled to said boost charge signal, said fast charge signal and said trickle charge signal for charging said battery at a first preselected rate in response to said boost charge signal or said fast charge signal, said charging means further including means for charging said battery at a second preselected rate in response to said charge signal wherein said second preselected rate is lower than said first preselected rate;
   a timer;
   means coupled to said timer, said charging means, and said voltage monitoring means for terminating the charging of said battery at said first preselected rate and for indicating a fault condition if the voltage of said battery is not greater than said first predetermined level after said battery has charged at said first preselected rate for a first predetermined time period;
   means for receiving an extended charge signal provided externally; and
   means coupled to said extended charge signal and said voltage monitoring means for partially discharging said battery in response to said extended charge signal if the voltage of said battery is above a third predetermined level, wherein said battery is discharged until the voltage of said battery reaches a fourth predetermined level, said third predetermined level being greater and said fourth predetermined level being less than said first predetermined level.

6. The battery charger of claim 5, wherein said means for partially discharging said battery is coupled to said timer and discontinues discharging said battery and indicates a fault condition if the voltage of said battery does not reach said fourth predetermined level after a third predetermined time period while said battery is being discharged.

7. The battery charger of claim 5, further including means coupled to said fast charge signal for disabling said extended charge signal if said fast charge signal is being provided.

8. A battery charger, comprising:

a battery;

means coupled to said battery for monitoring the voltage of said battery including means for converting the voltage of said battery to a corresponding digital voltage signal;

means coupled to said voltage monitoring means for providing a boost charge signal if the voltage of said battery is below a first predetermined voltage level;

means coupled to said voltage monitoring means for providing a fast charge signal if the voltage level of said battery is above said first preselected level;

means coupled to said boost charge signal and said fast charge signal for charging said battery at a first preselected rate in response to said boost charge signal or said fast charge signal;

a timer;

means coupled to said timer, said charging means and said voltage monitoring means for terminating the charging of said battery at said first preselected rate and for indicating a fault condition if the voltage of said battery is not greater than said first predetermined level after said battery has charged at said first preselected rate for a first predetermined time period;

a register having an input and an output, said input being coupled to said digital voltage signal, said register providing a previous digital voltage signal at its output;

a first comparator having a first and a second input, said first input being coupled to said digital voltage signal and said second input being coupled to said previous digital voltage signal, said first comparator having an output providing a peak charge signal in response to said digital voltage signal being greater than said previous digital signal;

an adder having a first and a second input and an output, said first input being coupled to said digital voltage signal and said second input being coupled to a preselected digital signal, said adder providing a summed signal at said adder output in response to said peak charge signal, wherein said summed signal is the addition of said digital voltage signal and said preselected digital signal;

a second comparator having a first input and a second input, said first input being coupled to said summed signal and said second input being coupled to said previous digital voltage signal, said second comparator having an output providing a fast charge end signal in response to said summed signal being less than said previous digital voltage signal; and means coupled to said fast charge end signal for providing a trickle charge signal in response to said fast charge end signal being provided, wherein said charging means is coupled to said trickle charge signal and further includes means for charging said battery at a second preselected rate in response to said trickle charge signal wherein said second preselected rate is less than said first preselected rate.

9. A battery charger, comprising:

a battery;

means coupled to said battery for monitoring the voltage of said battery;

means coupled to said voltage monitoring means for providing a boost charge signal if the voltage of said battery is below a first predetermined voltage level;

means coupled to said voltage monitoring means for providing a fast charge signal if the voltage of said battery is above said first preselected level;

means coupled to said boost charge signal and said fast charge signal for charging said battery at a first preselected rate in response to said boost charge signal or said fast charge signal;

a timer; and means coupled to said timer, said charging means, said fast charge signal and said voltage monitoring means for terminating the charging of said battery at said first preselected rate and for indicating a fault condition if the voltage of said battery is not greater than said first predetermined level after said battery has charged at said first preselected rate for a first predetermined time period, and for terminating the charging of said battery at said first preselected rate if the voltage of said battery is not greater than a second predetermined level after a second predetermined time period initiated by said fast charge signal.

10. The battery charger of claim 9, wherein said second predetermined time period is approximately twelve hours.

* * * * *

UNITED STATES PATENT AND TRADEMARK OFFICE
CERTIFICATE OF CORRECTION

PATENT NO. : 5,304,916

DATED : April 19, 1994

INVENTOR(S) : Hung Q. Le, et al.

It is certified that error appears in the above-identified patent and that said Letters Patent is hereby corrected as shown below:

In col. 19, line 54, please replace "references" with --reference--.

Signed and Sealed this

Sixteenth Day of August, 1994

*Attest:*

BRUCE LEHMAN

*Attesting Officer*     Commissioner of Patents and Trademarks